(12) United States Patent
Choi et al.

(10) Patent No.: US 10,970,092 B2
(45) Date of Patent: Apr. 6, 2021

(54) TERMINAL WITH A DISPLAY INCLUDING A MAIN DISPLAY REGION AND A PURALITY OF SUB DISPLAY REGIONS AND METHOD FOR CONTROLLING THE SAME

(71) Applicant: LG ELECTRONICS INC., Seoul (KR)

(72) Inventors: Eunkyung Choi, Seoul (KR); Sunghye Yoon, Seoul (KR); Hyungtae Jang, Seoul (KR); Goeun Joo, Seoul (KR); Yoojin Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/708,394

(22) Filed: Dec. 9, 2019

(65) Prior Publication Data

US 2020/0117487 A1   Apr. 16, 2020

Related U.S. Application Data

(63) Continuation of application No. 15/724,436, filed on Oct. 4, 2017, now Pat. No. 10,503,527.

(30) Foreign Application Priority Data

Nov. 17, 2016 (KR) ........................ 10-2016-0153125

(51) Int. Cl.
*G06F 3/048* (2013.01)
*G06F 9/451* (2018.01)
(Continued)

(52) U.S. Cl.
CPC ............ *G06F 9/451* (2018.02); *G06F 3/0482* (2013.01); *G06F 3/0486* (2013.01);
(Continued)

(58) Field of Classification Search
CPC .... G06F 9/451; G06F 3/04817; G06F 3/0482; G06F 3/04845; G06F 3/04847;
(Continued)

(56) References Cited

U.S. PATENT DOCUMENTS 5,522,347 A    6/1996 Merino
10,503,527 B2  12/2019 Choi et al.
(Continued)

FOREIGN PATENT DOCUMENTS

CN   104866065   8/2015
CN   105700785   6/2016
(Continued)

OTHER PUBLICATIONS

European Patent Office Application Serial No. 17001770.1, Search Report dated Mar. 27, 2018, 12 pages.
(Continued)

*Primary Examiner* — Haoshian Shih
(74) *Attorney, Agent, or Firm* — Lee, Hong, Degerman, Kang & Waimey

(57) ABSTRACT

The present invention relates to a terminal and a method of operating the terminal. The terminal can execute at least one task. The terminal can execute at least one task, can cause the display to display a soft key and information related to the executed at least one task at a first region of the display and can cause the display to display at least one function indicator related to the information at a second region of the display.

18 Claims, 27 Drawing Sheets

(51) Int. Cl.
  *G06F 3/0488* (2013.01)
  *H04M 1/72403* (2021.01)
  *H04M 1/72469* (2021.01)
  *G06F 3/0481* (2013.01)
  *G06F 3/0482* (2013.01)
  *G06F 3/0484* (2013.01)
  *G06F 3/0485* (2013.01)
  *G06F 3/0486* (2013.01)
  *G06F 3/0487* (2013.01)

(52) U.S. Cl.
  CPC .......... *G06F 3/0487* (2013.01); *G06F 3/0488* (2013.01); *G06F 3/04817* (2013.01); *G06F 3/04845* (2013.01); *G06F 3/04847* (2013.01); *G06F 3/04855* (2013.01); *G06F 3/04883* (2013.01); *G06F 3/04886* (2013.01); *H04M 1/72403* (2021.01); *H04M 1/72469* (2021.01)

(58) Field of Classification Search
  CPC .. G06F 3/04855; G06F 3/0486; G06F 3/0487; G06F 3/0488; G06F 3/04883; G06F 3/04886; H04M 1/72522; H04M 1/72583
  See application file for complete search history.

(56) References Cited

U.S. PATENT DOCUMENTS

| | | | |
|---|---|---|---|
| 2008/0320391 A1 | 12/2008 | Lemay et al. | |
| 2009/0178007 A1 | 7/2009 | Matas et al. | |
| 2011/0119610 A1 | 5/2011 | Hackborn et al. | |
| 2012/0023425 A1 | 1/2012 | Hackborn et al. | |
| 2013/0322634 A1* | 12/2013 | Bennett | G06F 3/04815 381/17 |
| 2015/0061881 A1* | 3/2015 | Jeon | H04M 1/0245 340/687 |
| 2015/0243245 A1* | 8/2015 | Jung | H04W 52/029 345/520 |
| 2016/0170614 A1 | 6/2016 | Chun et al. | |
| 2016/0265952 A1 | 9/2016 | Hwang | |
| 2017/0115722 A1* | 4/2017 | Chen | G06F 1/3212 |
| 2018/0136947 A1 | 5/2018 | Choi et al. | |

FOREIGN PATENT DOCUMENTS

| WO | 2009002942 | 12/2008 |
|---|---|---|
| WO | 2016104861 | 6/2016 |

OTHER PUBLICATIONS

Rupesh Sinha, "How to Customize Navigation Bar on Android", Retrieved from the web, XP055459779, Sep. 2016, 10 pages.
Anonymous: "Making the status bar and navigation bar transparent, with a ListView, on Android 4.4 KitKat", Retrieved from the web, XP055459788, Dec. 2013, 8 pages.
U.S. Appl. No. 15/724,436, Office Action dated Jan. 28, 2019, 23 pages.
State Intellectual Property Office of the People's Republic of China Application Serial No. 201711138432.9, Office Action dated Aug. 3, 2020, 9 pages.

* cited by examiner

FIG. 7
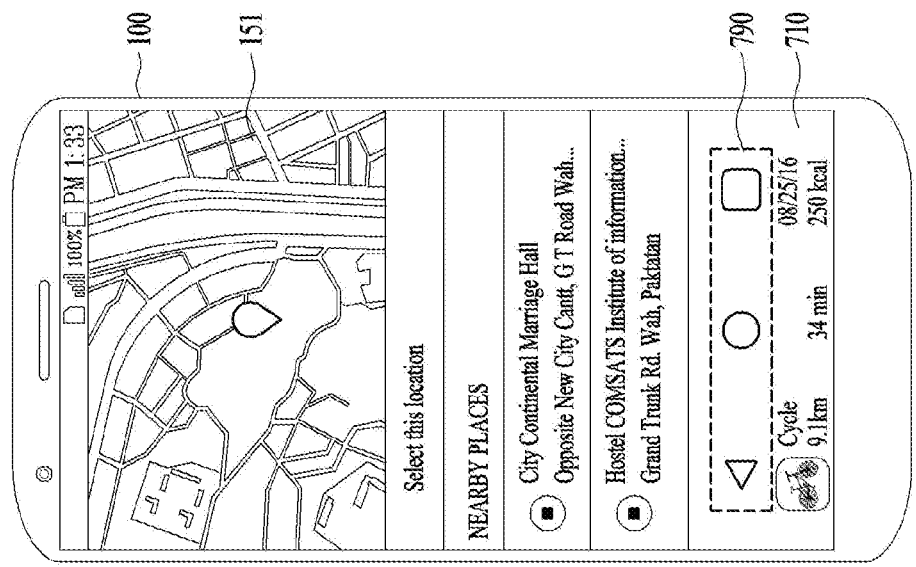
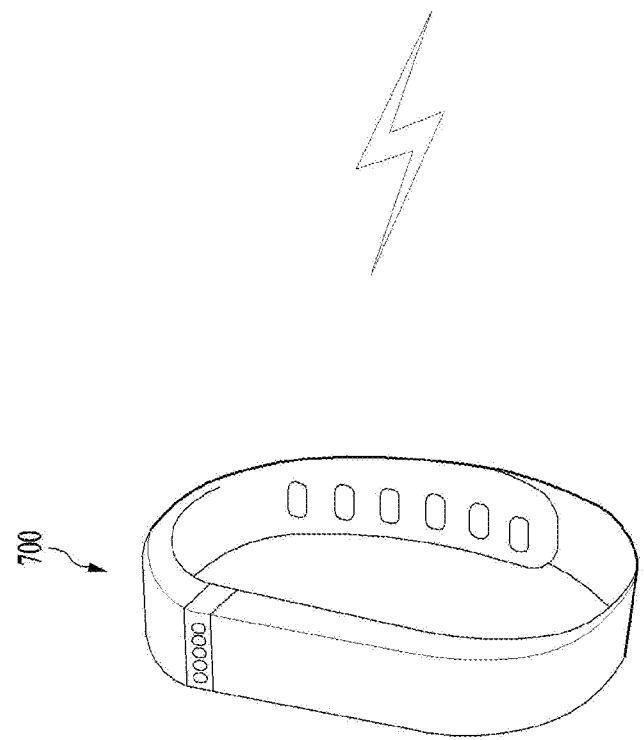

FIG. 13
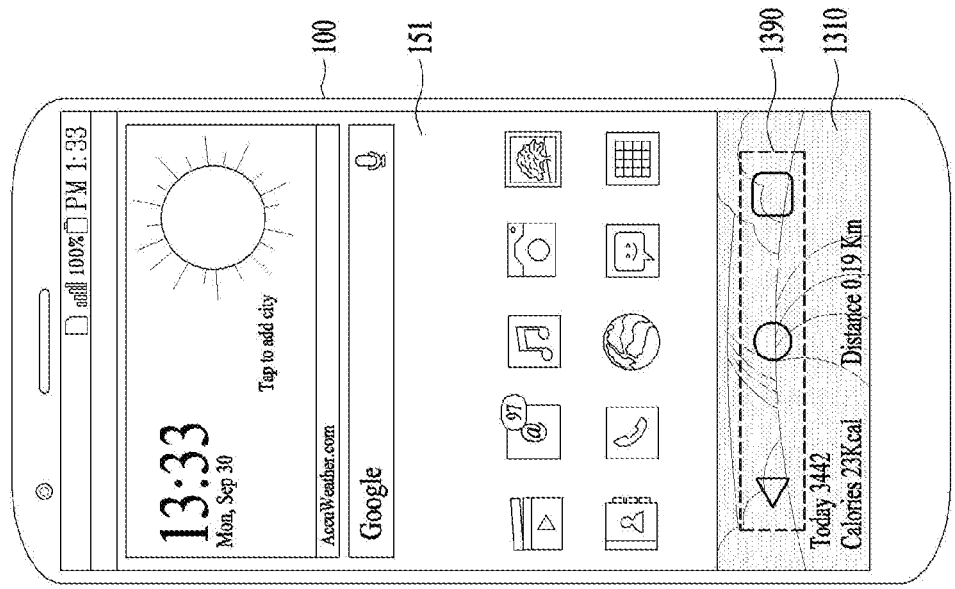
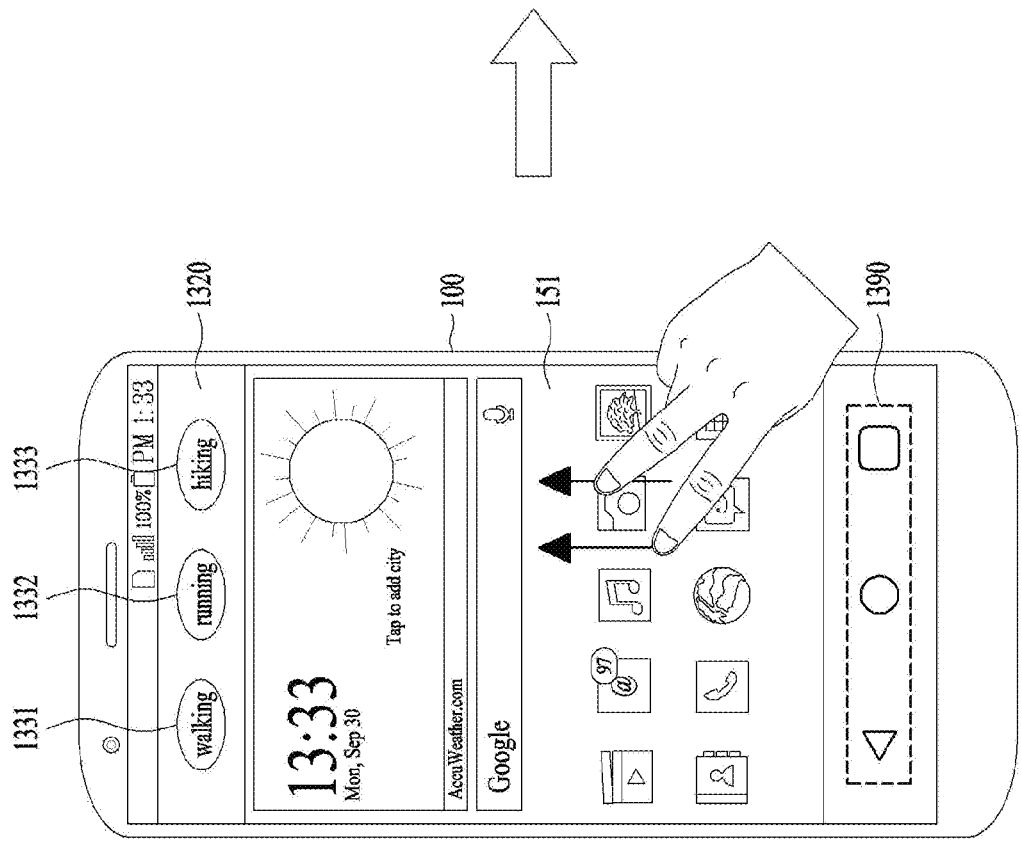

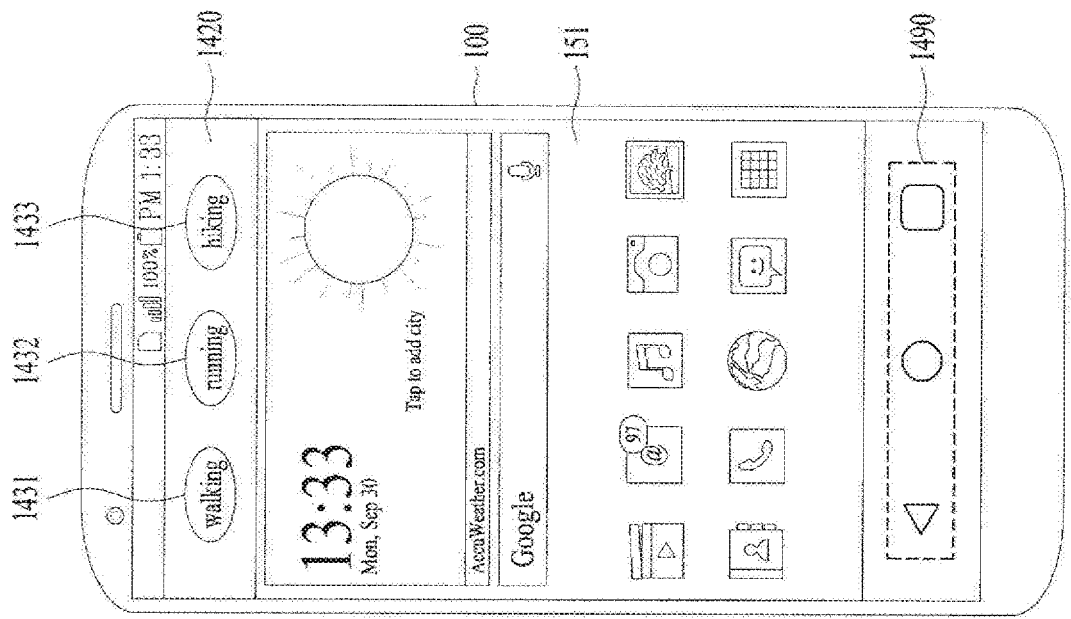
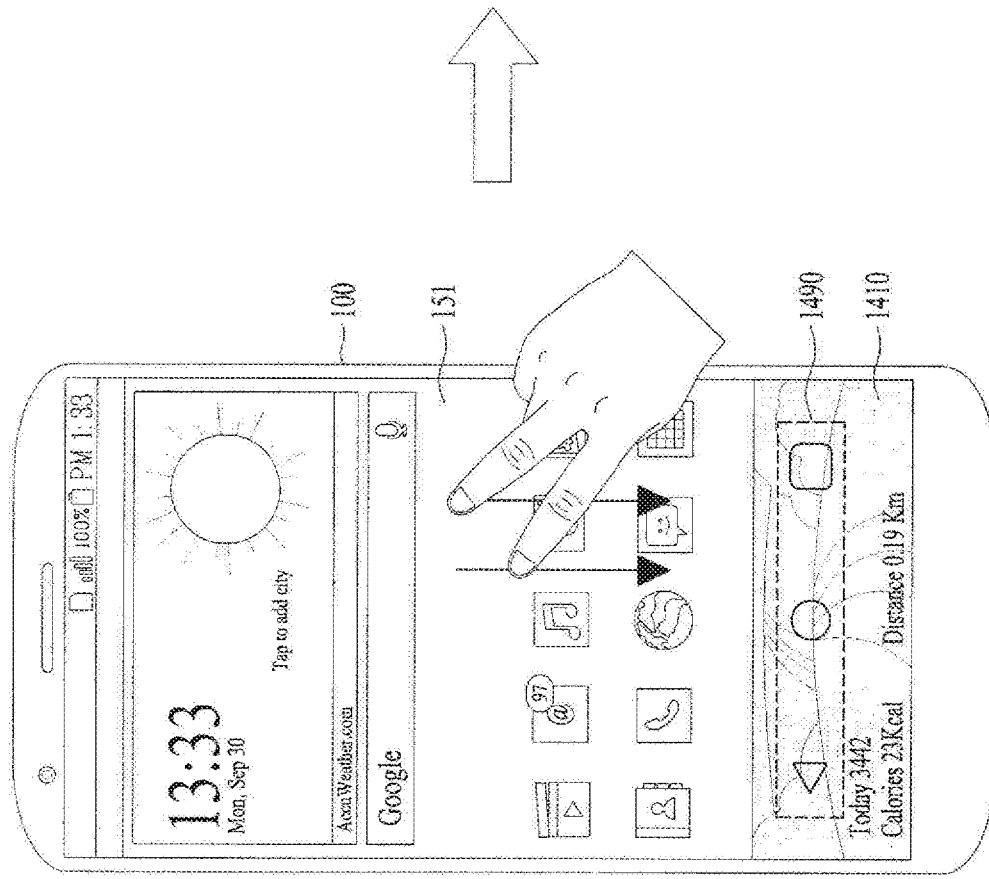
FIG. 14

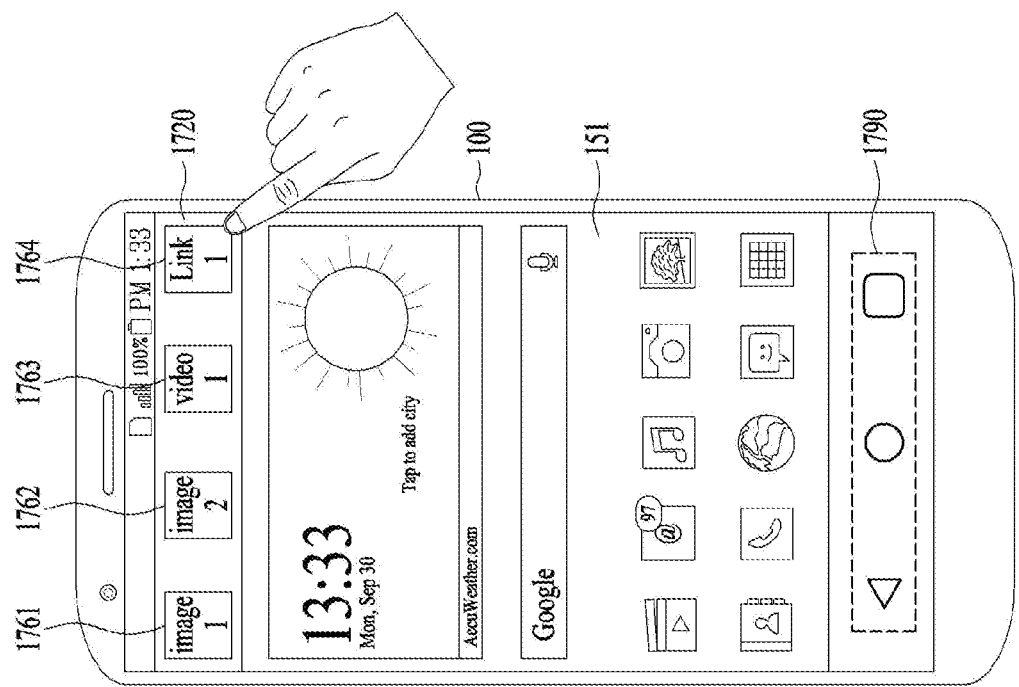
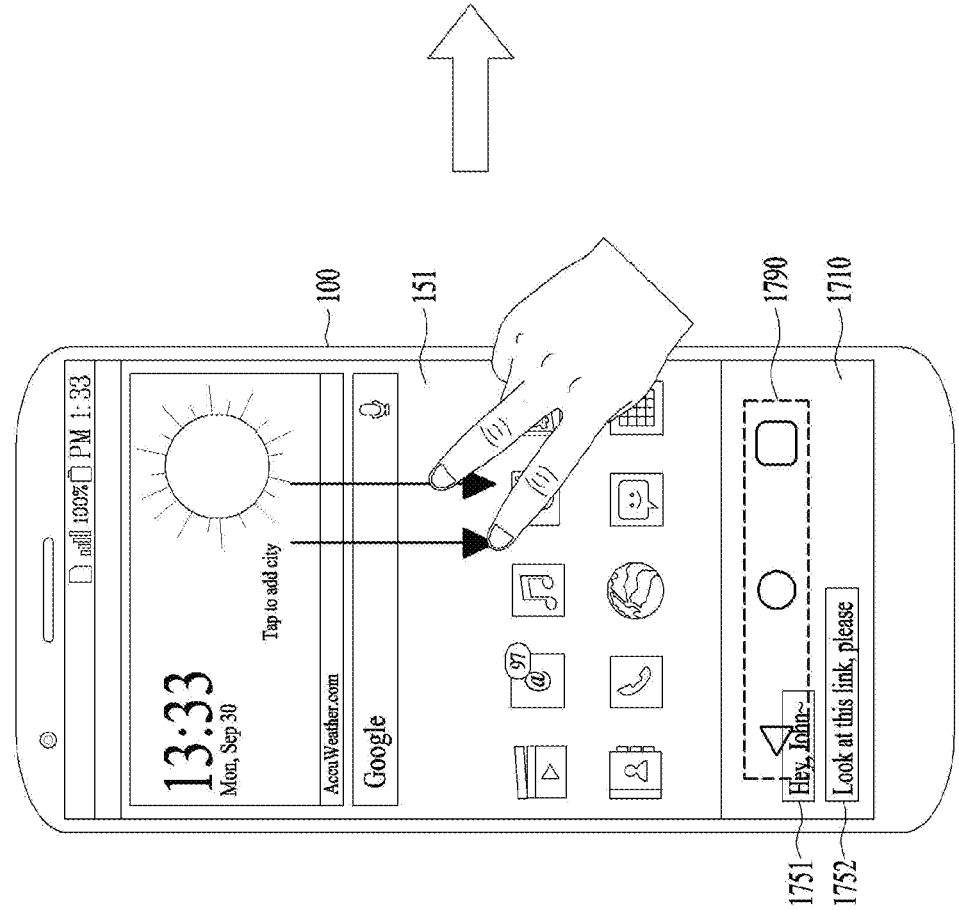
FIG. 17

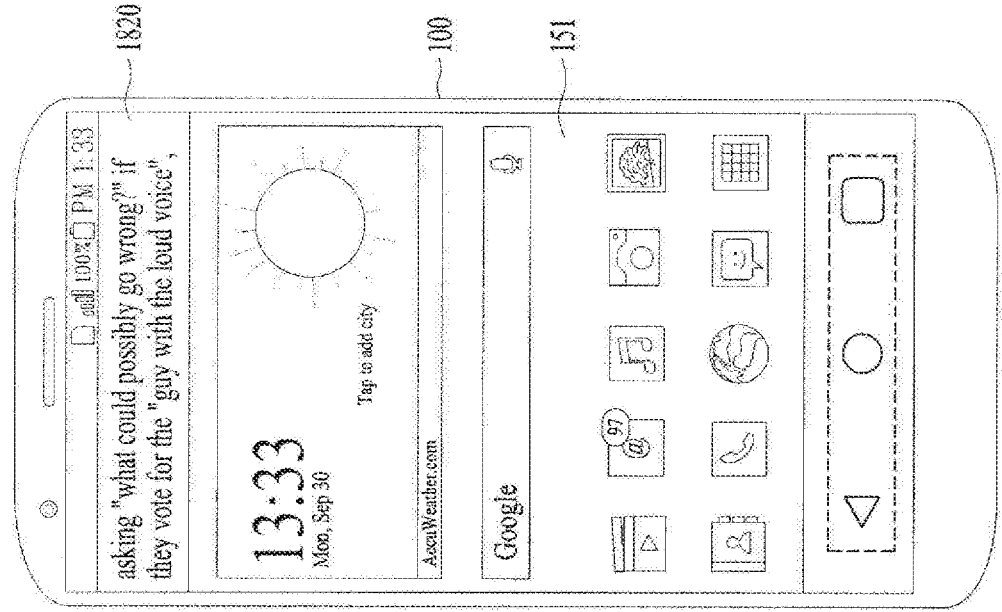
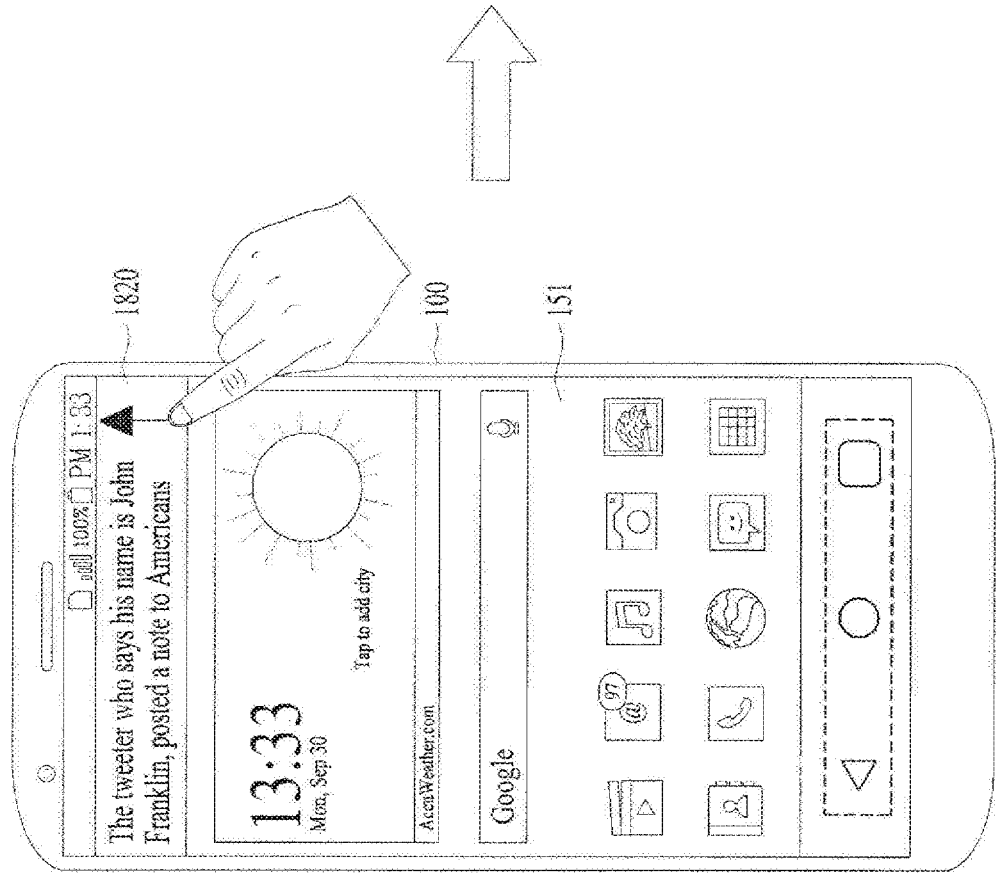
FIG. 18

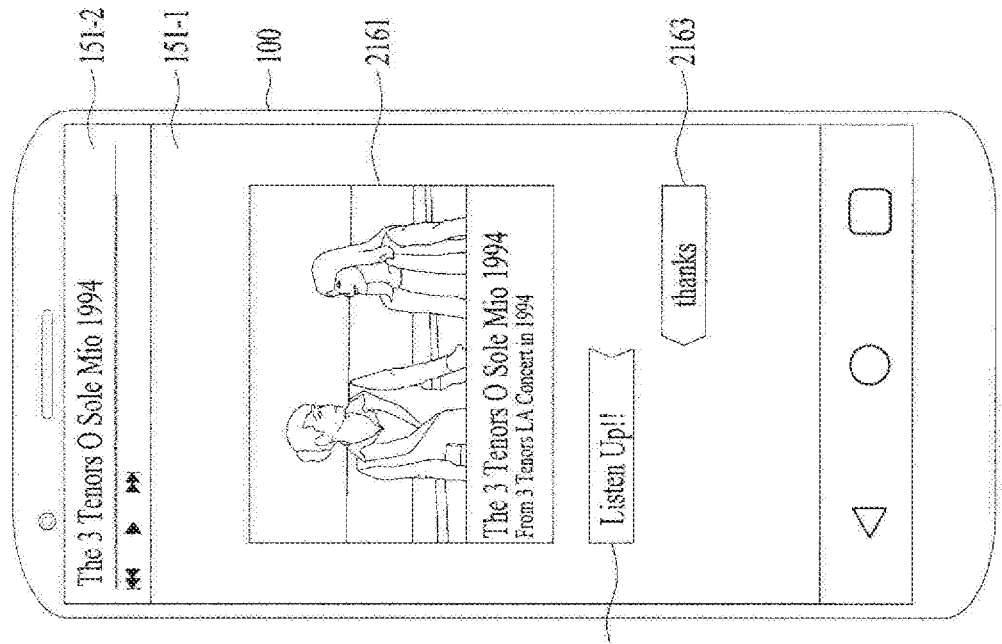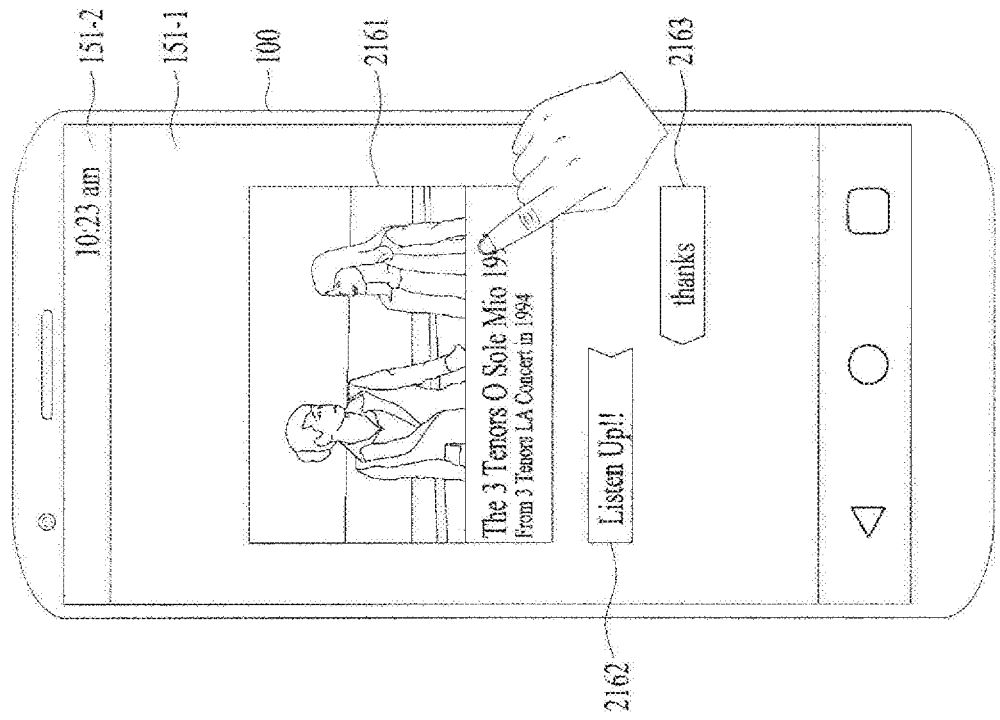
FIG. 21

FIG. 22
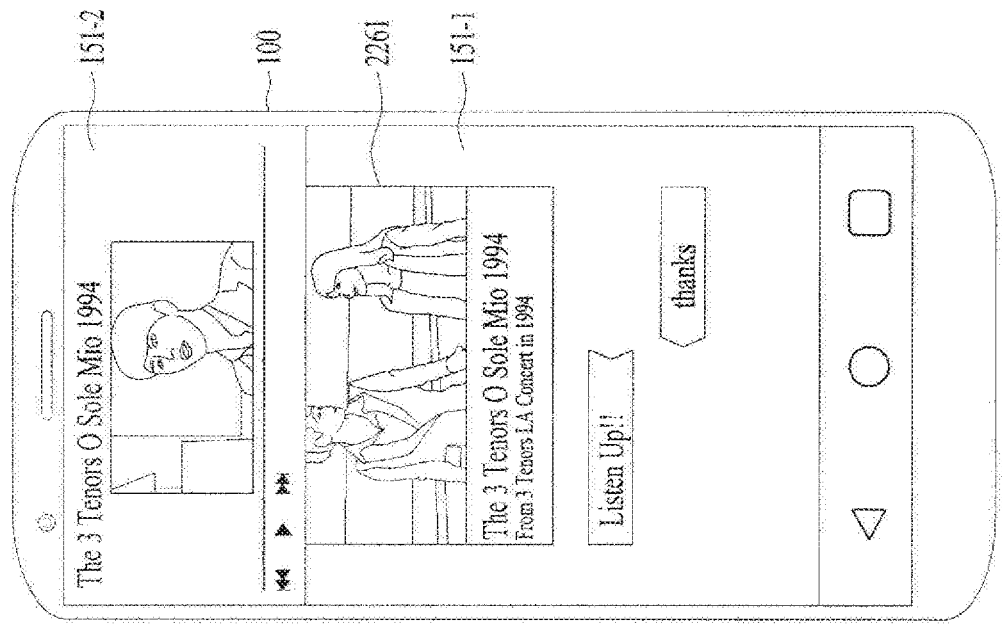
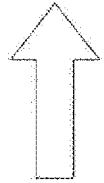
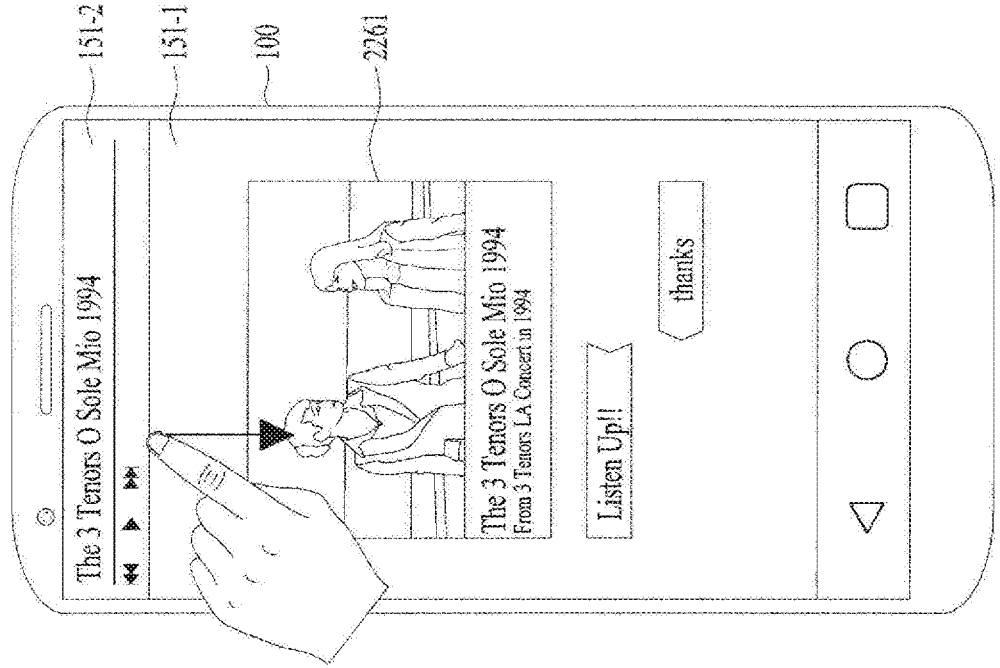

FIG. 23
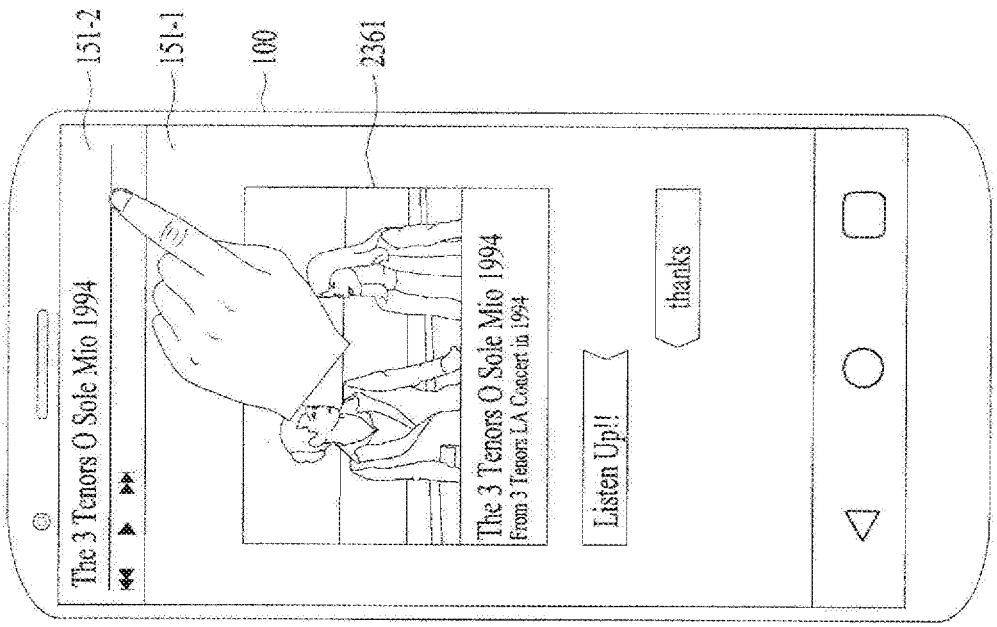
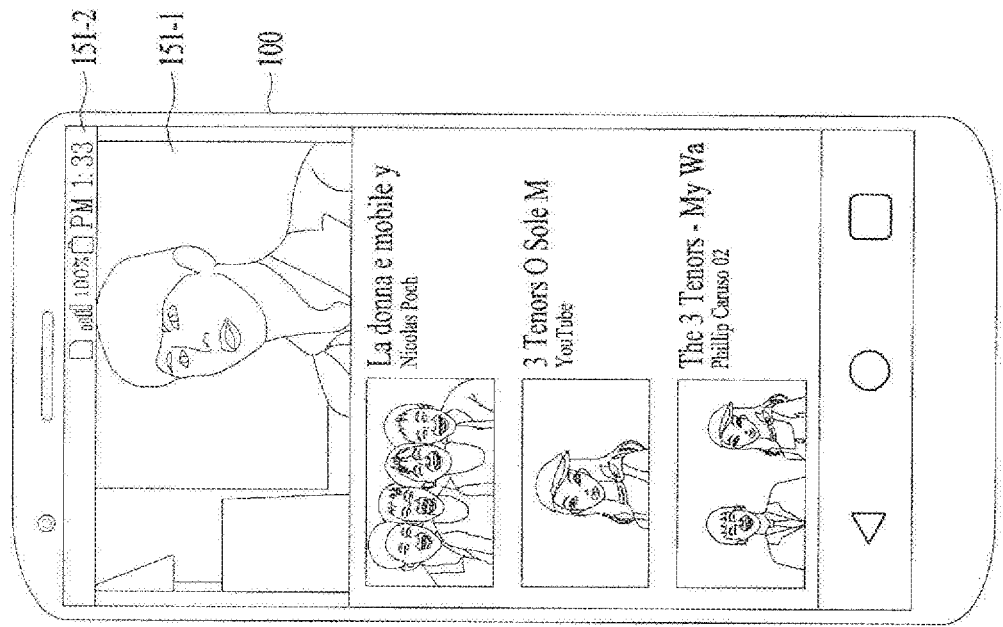

TERMINAL WITH A DISPLAY INCLUDING A MAIN DISPLAY REGION AND A PURALITY OF SUB DISPLAY REGIONS AND METHOD FOR CONTROLLING THE SAME

CROSS-REFERENCE TO RELATED APPLICATION

This application is a continuation of U.S. patent application Ser. No. 15/724,436 filed on Oct. 4, 2017, now U.S. Pat. No. 10,503,527, which claims the benefit of earlier filing date and right of priority to Korean Patent Application No. 10-2016-0153125, filed on Nov. 17, 2016, the contents of which are hereby incorporated by reference herein in their entirety.

BACKGROUND OF THE INVENTION

Field of the Invention

The present invention relates to a terminal and a method of controlling therefor. More particularly, the present invention relates to a terminal providing information on a currently executing task and a method of controlling therefor.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, as a size of a display of a terminal is getting bigger, a physical key or a button of the terminal is removed and a touch input scheme using an icon or a button displayed on the display is widely using.

However, although a size, a ratio, and performance of a terminal are changed and UI (user interface)/UX (user experience) is evolved, UI/UX for the touch input scheme is not considerably changed.

Hence, it is necessary to improve the UI/UX to use information or a virtual key displayed on a terminal according to a change of a display ratio of the terminal and a change of user environment.

SUMMARY OF THE INVENTION

Accordingly, the present invention is directed to an apparatus and method thereof that substantially obviate one or more problems due to limitations and disadvantages of the related art.

An object of the present invention is to provide various informations to a user by variously and efficiently utilizing a display area and provide a user interface and a user experience to enable the user to easily control a terminal.

Another object of the present invention is to provide information on a currently executing task to a user by utilizing a soft key area which is fixedly displayed.

Another object of the present invention is to provide information on a selected task or a function to a user without switching a screen in a manner of providing a screen for a task requiring screen switch to a partial area of a display or a second display.

The other object of the present invention is to provide a user with an intuitive user interface for various tasks.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a terminal can include a display, and a controller configured to execute at least one task, cause the display to display a soft key and information related to the executed at least one task at a first region of the display and cause the display to display at least one function indicator related to the information at a second region of the display.

The controller can perform a function corresponding to a function indicator selected from the at least one function indicator.

The information is displayed as a background image at the first region and the soft key is displayed on the background image at the first region The controller can execute at least one task selected from the group consisting of a task of executing an application, a task of connecting with an external device, and a task of inserting a storage.

The controller can display information on the executed application on the first region and display at least one function indicator related to the executed application on the second region.

The controller can cause the display to display information related to the executed application at the first region and display at least one function indicator related to the executed application at the second region.

The controller can cause the display to display information related to the connected external device at the first region and display at least one function indicator related to the connected external device at the second region.

The controller can cause the display to display information related to the inserted storage at the first region and display a file explorer for managing at least one file included in the inserted storage at the second region The soft key can include at least one of a home key, a back key, or a menu key.

The at least one function indicator can include the at least one function indicator comprises at least one of a function icon related to the information, a link related to the information, or content related to the information.

The first region is located at a bottommost area of the display and the second region is located at a topmost area of the display.

To further achieve these objects and other advantages and in accordance with the purpose of the invention, as embodied and broadly described herein, according to a different embodiment, a method of operating a terminal includes the steps of executing at least one task, displaying a soft key and information related to the executed at least one task at a first region of a display and displaying at least one function indicator related to the information at a second region of the display.

According to the embodiments of the present invention, a terminal can provide a user with information on a currently executing task and a control user interface for the currently executing task by variously and efficiently utilizing a display area.

According to the present invention, it is able to utilize a soft key area fixedly displayed on a display area in providing information.

According to the present invention, it is able to provide a screen for a task requiring screen switch without switching a screen.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram for an embodiment of displaying a soft key and health device information on a first region according to various embodiments of the present invention;

FIG. 13 is a diagram for an example of switching a second region into a first region according to various embodiments of the present invention;

FIG. 14 is a diagram for an example of switching a first region into a second region according to various embodiments of the present invention;

FIG. 17 is a diagram for an example of displaying an indicator for a new task according to various embodiments of the present invention;

FIG. 18 is a diagram for an example of displaying a selected link according to various embodiments of the present invention;

FIG. 21 is a diagram for an example of displaying a new task according to various embodiments of the present invention;

FIGS. 22 and 23 are diagrams for an example of controlling a screen size of a new task according to various embodiments of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
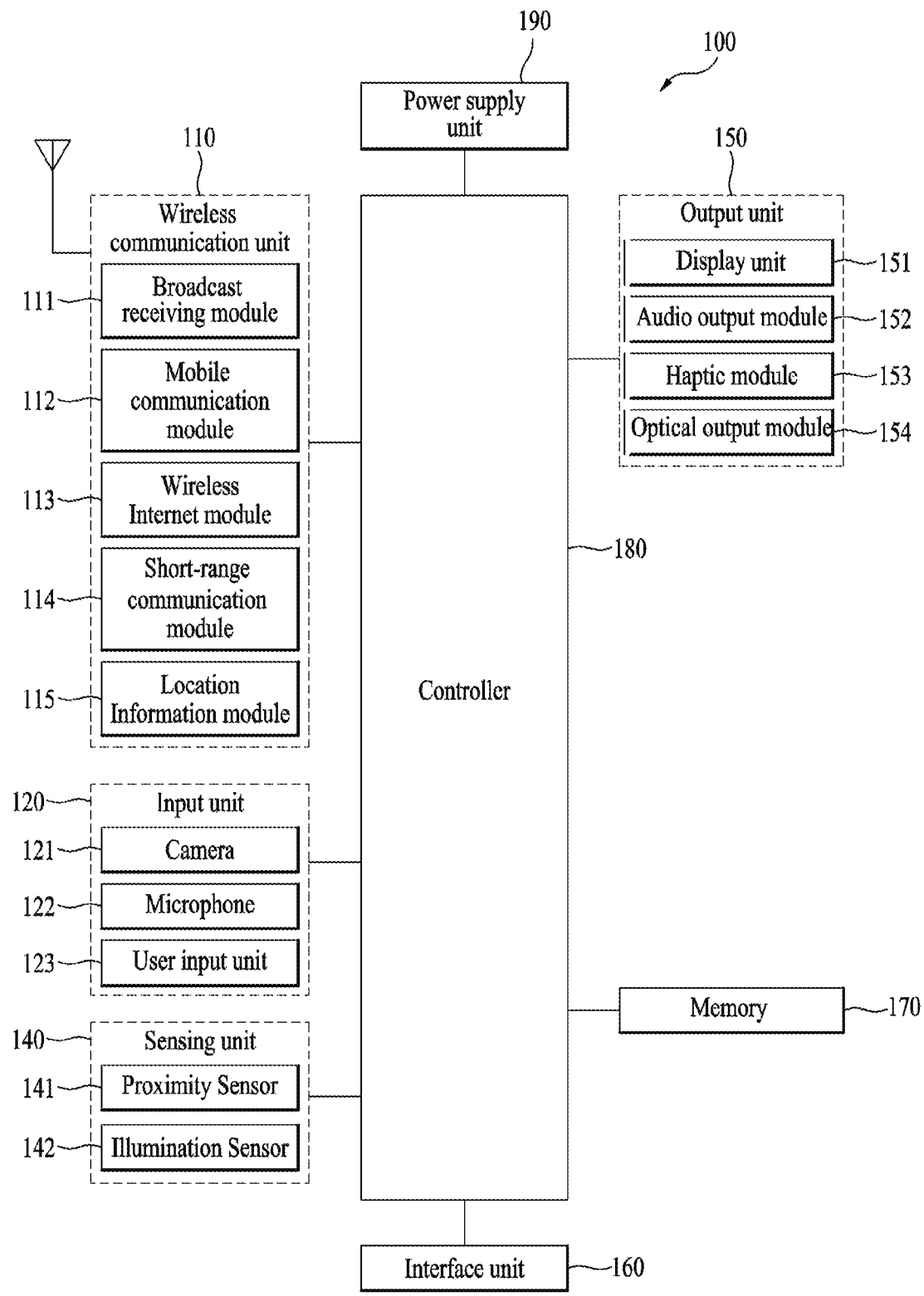
FIG. 1A is a block diagram to describe a terminal related to the present invention.
Figure 1B:
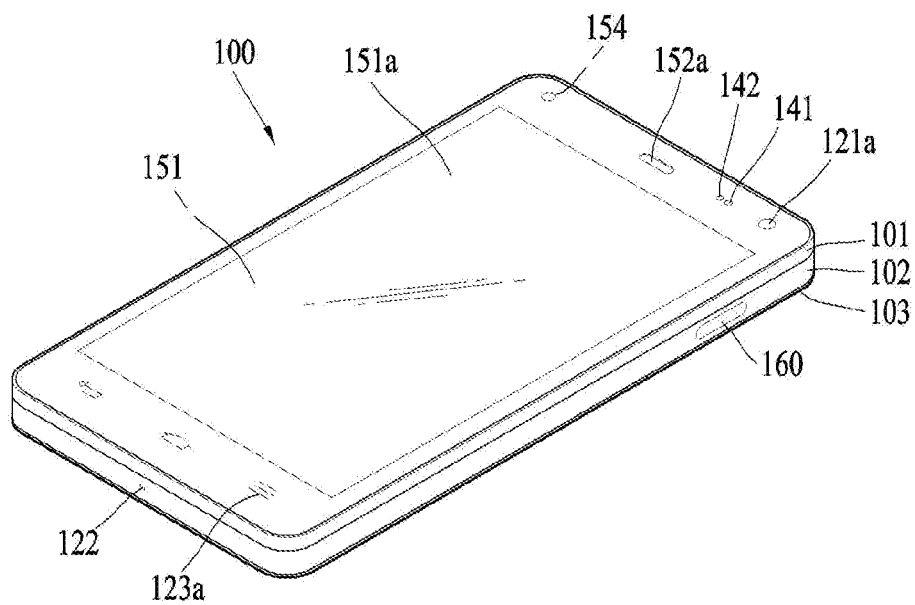
FIG. 1B and FIG. 1C are diagrams for the concept of one example of a terminal related to the present invention in different views, respectively.
Figure 1C:
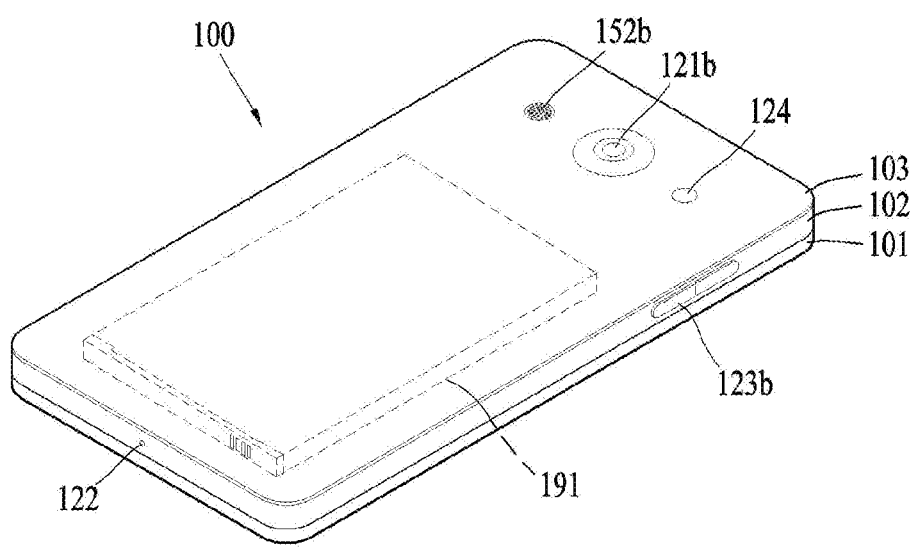
Figure 10:
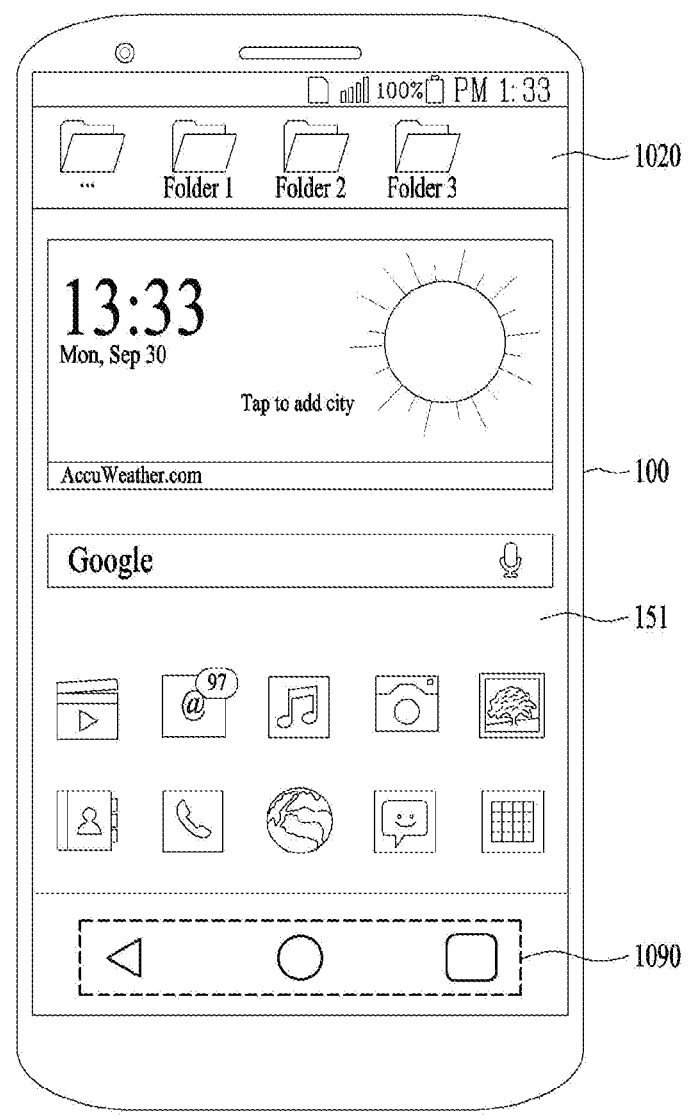
FIG. 10 is diagram for an example of displaying a storing means on a second region according to various embodiments of the present invention.

Reference is now made to FIGS. 1A-1C, where FIG. 1A is a block diagram of a mobile terminal in accordance with the present disclosure, and FIGS. 1B and 10 are conceptual views of one example of the mobile terminal, viewed from different directions.

The mobile terminal 100 is shown having components such as a wireless communication unit 110, an A/V input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The A/V input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121b may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear cover 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, the display unit 151 may have a plurality of display regions. For example, the display unit 151 may have a main display region 151-1 and a sub display region 151-2. As an embodiment, a display of the display unit 151 can be divided into a main display region 151-1 and a sub display region 151-2. As a different embodiment, the display unit 151 may have a plurality of display modules. For example, a first display module may correspond to the main display region 151-1 and a second display module may correspond to the sub display region 151-2. It may be able to turn on/off the main display region 151-1 and the sub display region 151-2, respectively, and display different information on the main display region 151-1 and the sub display region 151-2. In this case, the sub display region 151-2 can also be referred to as a second display. Although the main display region 151-1 is turned off, the sub display region 151-2 can maintain a turn-on state and display various information. For example, the sub display region 151-2 can display configured information or information on an occurred alarm. Detail contents are described later.

It may be able to apply various screen ratios to the display unit 151. For example, the display unit 151 may have a ratio of 9:16 or a ratio of 9:18. And, the display unit 151 may have a ratio of 10:16 or a ratio of 3:4. The above-mentioned specific screen ratio is just an example only. It may be able to apply various screen ratios according to a selection of a designer.

A fingerprint recognition sensor can be embedded in the display unit 151. Hence, the terminal 100 can recognize a fingerprint of a user contacted with a partial region of the display unit 151.

The terminal 100 according to various embodiments can display information on a currently executing task on a partial region of a display region of the display unit 151 and display a control menu for the displayed task on a different region. For example, the terminal 100 can fixedly display the information on the currently executing task on the partial region of the display region of the display unit 151. If it is necessary to control the currently executing task displayed on the partial region, the terminal 100 can display a control menu on a partial region of the display region of the display unit 151. In this case, the task may correspond to various tasks processed in the terminal 100. For example, the task may include executing an application, connecting or communicating with an external device, reading a storing means, and the like. Details contents are described later.

Figure 2:
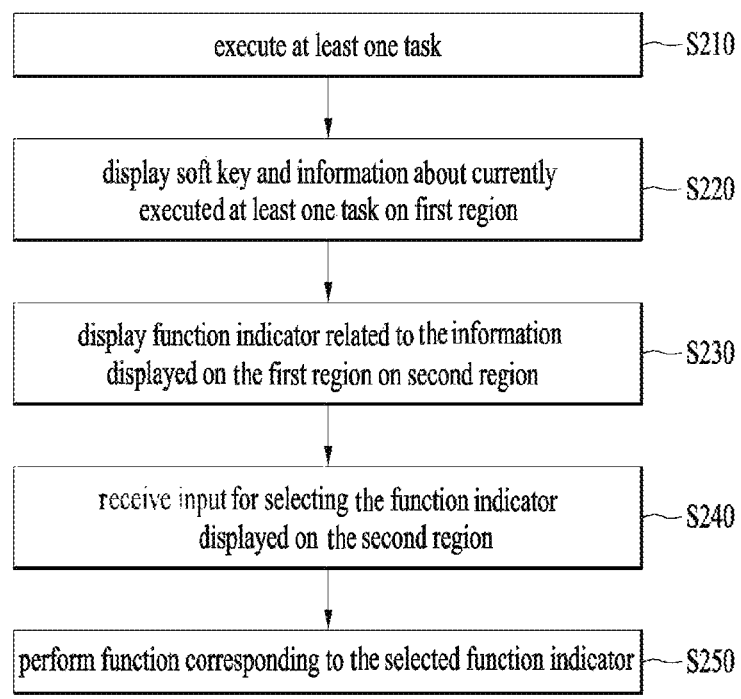
FIG. 2 is a flowchart for a method operating a terminal according to various embodiments of the present invention.

FIG. 2 is a flowchart for a method operating a terminal according to various embodiments of the present invention.

Referring to FIG. 2, the terminal 100 can execute at least one task [S210].

For example, the controller 180 of the terminal 100 can execute at least one task capable of being performed in the terminal. As an embodiment, the controller 180 can execute at least one application. For example, the controller 180 can execute at least one application among various applications capable of being implemented in the terminal including a phone call application, a message application, a web browser application, a music application, an image application, a map application, a health application, a recording application, and the like. And, the at least one application executed by the terminal 100 may correspond to an application related to an external device connecting or communicating with the terminal. Hence, the controller 180 can execute a task related to at least one external device connected with the terminal or a task related to at least one external device communicating with the terminal. And, the controller 180 can execute a task related to a storing means connected with the terminal 100. In this case, the storing means connected with the terminal 100 may correspond to a storing means inserted into the terminal 100 or a storing means connected with the interface unit 160 of the terminal 100.

The terminal 100 can display a soft key and information on at least one task currently executed in the terminal on a first region corresponding to a partial region of the display unit 151 [S220].

For example, the controller 180 can display information on at least one task currently executed in the terminal on a first region corresponding to a partial region of the display unit 151 and can also display a soft key on the first region on which the information on the at least one task currently executed in the terminal is displayed. In this case, the soft key may correspond to a key, a switch, or a button, which is related to an operation or a function of the terminal 100, displayed on the display unit 151. For example, the soft key can include a home key corresponding to a key for a basic operation of the terminal 100, a back key, and a menu key. The soft key may have a navigation bar form. The first region can also be referred to as a view region.

The first region corresponding to a partial region of the display unit 151 may correspond to a partial region of the entire display region of the display unit 151. For example, the first region may correspond to a region located at one end of the display region of the display unit 151. As an embodiment, the first region may correspond to a region located at the bottommost of the entire display region of the display unit 151. A second region described in the following may correspond to a region located at an opposite end of the first region. The second region can also be referred to as a controller region. As an embodiment, the second region may correspond to a region located at the topmost of the entire display region of the display unit 151. Details contents on the second region are described later. Positions on which the first region and the second region are displayed may change according to the rotation of the terminal 100. Or, the positions on which the first region and the second region are displayed can be maintained. For example, if the terminal 100 rotates from a portrait mode to a landscape mode or rotates from the landscape mode to the portrait mode, at least one position of the first region and the second region may change in response to the rotated mode. As an embodiment, although the terminal 100 rotates from the portrait mode to the landscape mode or rotates from the landscape mode to the portrait mode, the controller 180 can control the first region to be positioned at the bottommost of the display region. In particular, the first region can be positioned at one end of the display region irrespective of a mode of the terminal. As a different embodiment, if the terminal 100 is changed to the landscape mode from the portrait mode, the controller 180 can control the first region to be positioned at one end of the display region rather than the bottommost.

Specific embodiments for the aforementioned contents are explained with reference to FIGS. 3 to 6.

Figure 3:
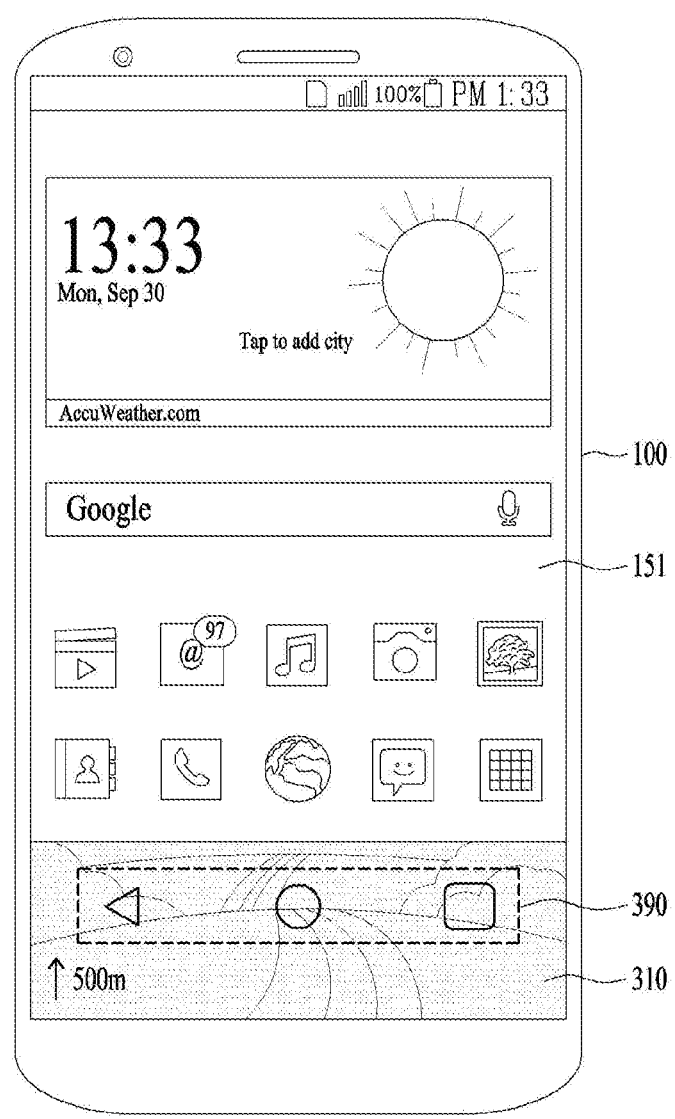
FIG. 3 is a diagram for an embodiment of displaying a soft key and navigation application information on a first region according to various embodiments of the present invention.

FIG. 3 is a diagram for an embodiment of displaying a soft key and navigation application information on a first region according to various embodiments of the present invention.

Referring to FIG. 3, the terminal 100 can execute a navigation application. In this case, the navigation application may correspond to a map application. The terminal 100 can display information on the navigation application corresponding to an executed task on the first region corresponding to a partial region of the display unit 151. For example, the controller 180 can display the information on the executed navigation application on the first region 310 positioned at the bottommost of the display unit 151. As an embodiment, the controller 180 can display a distance and a direction to a destination on the first region 310. And, the controller 180 can display a map including a path to the destination and a current position on the first region 310. The controller 180 can display a soft key 390 on the first region 310 on which the information on the executed navigation application is displayed. For example, the controller 180 can display a navigation bar including a home key, a back key, and a menu key 390 on the first region 310. Meanwhile, the terminal 100 can display the information on the executed navigation application on the first region 310 as a background image and can display the home key, the back key, and the menu key 390 on the first region 310 on which the information on the navigation application is displayed as the background image. The terminal 100 can continuously display the information on the navigation application on the first region 310 in real time. And, the terminal can maintain the first region 310. For example, although the controller 180 follows an operation or a function of the terminal, the controller 180 can continuously or fixedly display the information on the navigation application and the soft key 390 on the first region 310. The terminal 100 can display various images on a remaining region (hereinafter, main region) except the first region 310 among the entire display region of the display unit 151. For example, the controller 180 can display an image of a different application rather than the navigation application or a home screen on the main region corresponding to the remaining region except the first region 310 among the entire display region of the display unit 151. And, the controller 180 can display an image of the navigation application on the main region. In particular, a user can check the information on the navigation application via the first region 310 without switching a screen of the navigation application.

Figure 4:
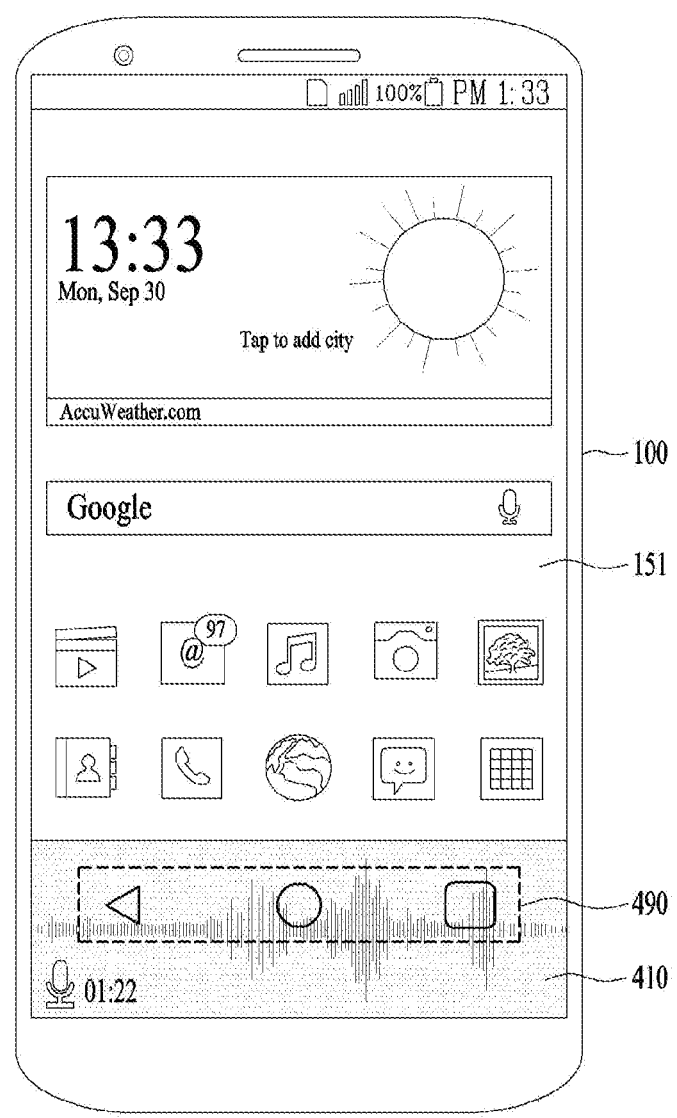
FIG. 4 is a diagram for an embodiment of displaying a soft key and recording application information on a first region according to various embodiments of the present invention.

FIG. 4 is a diagram for an embodiment of displaying a soft key and recording application information on a first region according to various embodiments of the present invention.

Referring to FIG. 4, the terminal 100 can execute a recording application. The terminal 100 can display information on the recording application corresponding to an executed task on the first region corresponding to a partial region of the display unit 151. For example, the controller 180 can display the information on the executed recording application on the first region 410 positioned at the bottommost of the display unit 151. As an embodiment, the controller 180 can display a soundwave of recording sound, recording time, and information on a recording operation on the first region 410. The controller 180 can display a soft key 490 on the first region 410 on which the information on the executed recording application is displayed. For example, the controller 180 can display a navigation bar including a home key, a back key, and a menu key 490 on the first region 410. Meanwhile, the terminal 100 can display the information on the executed recording application on the first region 410 as a background image and can display the home key, the back key, and the menu key 490 on the first region 410 on which the information on the recording application is displayed as the background image. The terminal 100 can continuously display the information on the recording application on the first region 410 in real time. And, the terminal can maintain the first region 410. For example, although the controller 180 follows an operation or a function of the terminal, the controller 180 can continuously or fixedly display the information on the recording application and the soft key 490 on the first region 410. The terminal 100 can display various images on a remaining region except the first region 410 among the entire display region of the display unit 151. For example, the controller 180 can display an image of a different application rather than the recording application or a home screen on the main region corresponding to the remaining region except the first region 410 among the entire display region of the display unit 151. And, the controller 180 can display an image of the recording application on the main region. In particular, a user can check the information on the recording application via the first region 410 without switching a screen of the recording application.

Figure 5:
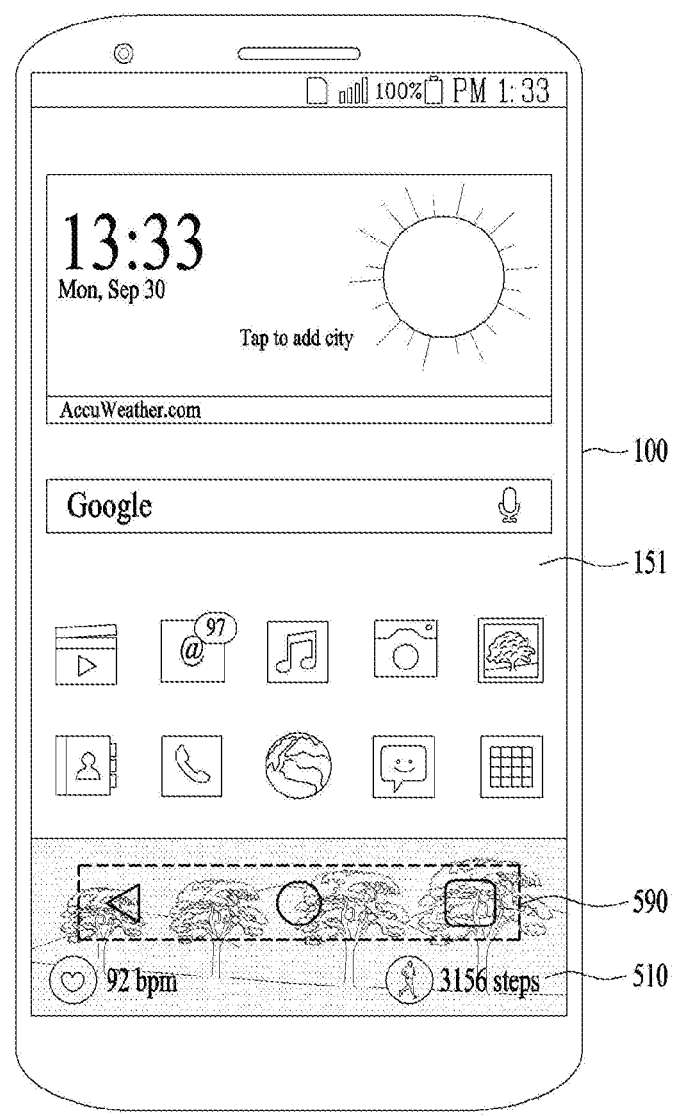
FIG. 5 is a diagram for an embodiment of displaying a soft key and health application information on a first region according to various embodiments of the present invention.

FIG. 5 is a diagram for an embodiment of displaying a soft key and health application information on a first region according to various embodiments of the present invention.

Referring to FIG. 5, the terminal 100 can execute a health application. In this case, the health application may correspond to an application for collecting and determining various health information on a terminal user. For example, the health application can sense and track a physical activity of the terminal user. The terminal 100 can display information on the health application corresponding to an executed task on the first region corresponding to a partial region of the display unit 151. For example, the controller 180 can display the information on the executed health application on the first region 510 positioned at the bottommost of the display unit 151. As an embodiment, the controller 180 can display a step count of a user and information on a heart rate on the first region 510. In this case, the step count may correspond to a step count accumulated from a specific timing (e.g., a step count accumulated during a day). The controller 180 can display a soft key 590 on the first region 510 on which the information on the executed health application is displayed. For example, the controller 180 can display a navigation bar including a home key, a back key, and a menu key 590 on the first region 510. Meanwhile, the terminal 100 can display the information on the executed health application on the first region 510 as a background image and can display the home key, the back key, and the menu key 590 on the first region 510 on which the information on the health application is displayed as the background image. The terminal 100 can continuously display the information on the health application on the first region 510 in real time. And, the terminal can maintain the first region 510. For example, although the controller 180 follows an operation or a function of the terminal, the controller 180 can continuously or fixedly display the information on the health application and the soft key 590 on the first region 510. The terminal 100 can display various images on a remaining region except the first region 510 among the entire display region of the display unit 151. For example, the controller 180 can display an image of a different application rather than the health application or a home screen on the main region corresponding to the remaining region except the first region 510 among the entire display region of the display unit 151. And, the controller 180 can display an image of the health application on the main region. In particular, a user can check the information on the health application via the first region 510 without switching a screen of the health application.

Figure 6:
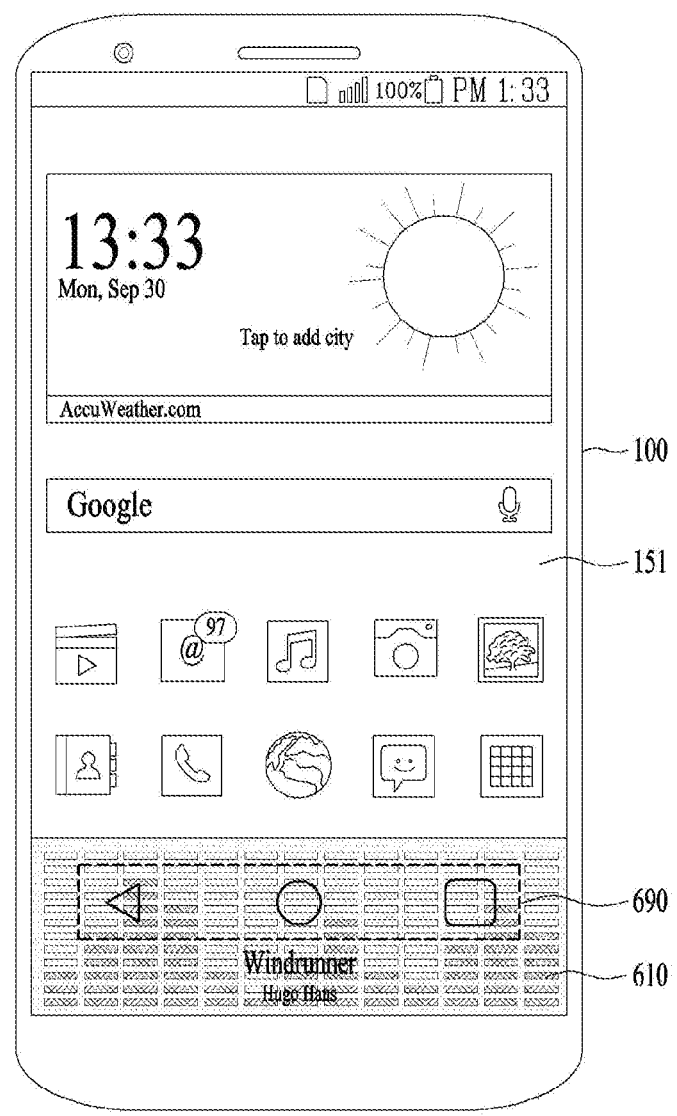
FIG. 6 is a diagram for an embodiment of displaying a soft key and music application information on a first region according to various embodiments of the present invention.

FIG. 6 is a diagram for an embodiment of displaying a soft key and music application information on a first region according to various embodiments of the present invention.

Referring to FIG. 6, the terminal 100 can execute a music application. In this case, the music application may correspond to an application for playing music content. The terminal 100 can display information on the music application corresponding to an executed task on the first region corresponding to a partial region of the display unit 151. For example, the controller 180 can display the information on the executed music application on the first region 610 positioned at the bottommost of the display unit 151. As an embodiment, the controller 180 can display content information such as a title of currently playing music and a singer and an audio equalizer for the music content on the first region 610. The controller 180 can display a soft key 690 on the first region 610 on which the information on the executed music application is displayed. For example, the controller 180 can display a navigation bar including a home key, a back key, and a menu key 690 on the first region 610. Meanwhile, the terminal 100 can display the information on the executed music application on the first region 610 as a background image and can display the home key, the back key, and the menu key 690 on the first region 610 on which the information on the music application is displayed as the background image. The terminal 100 can continuously display the information on the music application on the first region 610 in real time. And, the terminal can maintain the first region 610. For example, although the controller 180 follows an operation or a function of the terminal, the controller 180 can continuously or fixedly display the information on the music application and the soft key 690 on the first region 610. The terminal 100 can display various images on a remaining region except the first region 610 among the entire display region of the display unit 151. For example, the controller 180 can display an image of a different application rather than the music application or a home screen on the main region corresponding to the remaining region except the first region 610 among the entire display region of the display unit 151. And, the controller 180 can display an image of the music application on the main region. In particular, a user can check the information on the music application via the first region 610 without switching a screen of the music application.

FIG. 7 is a diagram for an embodiment of displaying a soft key and health device information on a first region according to various embodiments of the present invention.

Referring to FIG. 7, the terminal 100 can communicate with a health device 700. In this case, the health device may correspond to a device for sensing information on a body of a user and tracking a physical activity of the user. The terminal 100 can receive various information from the health device 700 connected with the terminal 100. The terminal can control an operation of the health device 700 or transmit a signal for controlling the health device. The terminal 100 can display the information received from the health device 700 on the first region corresponding to a partial region of the display unit 151. Specifically, the terminal 100 can display the information received from the health device 700 on the first region based on a health application. For example, the controller 180 can display information on a physical activity of a user tracked by the health device 700 on the first region 710 positioned at the bottommost of the display unit 151. As an embodiment, the controller 180 can display activity amount according to a physical activity of a user, a moving distance, calorie consumption, and information on exercise time on the first region 710. The controller 180 can display a soft key 790 on the first region 710 on which the information on a physical activity of a user tracked by the health device 700 is displayed. For example, the controller 180 can display a navigation bar including a home key, a back key, and a menu key 790 on the first region 710. Meanwhile, the terminal 100 can display the information received from the health device 700 on the first region 710 as a background image and can display the home key, the back key, and the menu key 790 on the first region 710 on which the information received from the health device 700 is displayed as the background image. The terminal 100 can continuously display the information received from the health device 700 on the first region 710 in real time. And, the terminal can maintain the first region 710. For example, although the controller 180 follows an operation or a function of the terminal, the controller 180 can continuously or fixedly display the information received from the health device 700 and the soft key 790 on the first region 710. The terminal 100 can display various images on a remaining region except the first region 710 among the entire display region of the display unit 151. For example, the controller 180 can display images of various applications rather than the information received from the health device 700 or a home screen on the main region corresponding to the remaining region except the first region 710 among the entire display region of the display unit 151. And, the controller 180 can display an image of the information received from the health device 700 on the main region. In particular, a user can check the information on the body of the user sensed by the health device 700 via the first region 710 without switching a screen of the information received from the health device 700.

As mentioned in the foregoing description, the terminal 100 can display a navigation bar and information on a currently executing task together on the first region corresponding to a partial region of the display unit 151. In this case, the terminal can fixedly display the navigation bar and the information on the currently executing task.

Referring back to FIG. 2,

The terminal 100 can display a function indicator related to the information displayed on the first region on a second region corresponding to a partial region of the display unit 151 [S230].

For example, the terminal 100 can display the function indicator related to the information displayed on the first region and at least one task on the second region. In this case, the function indicator may correspond to an indicator for controlling an operation or a function of the currently executed at least one task. For example, the function indicator may correspond to at least one selected from the group consisting of a menu, an icon, a key, a button, and a switch for controlling the operation or the function of the at least one task in progress. As an embodiment, the terminal 100 can display information on currently executing at least one application on the first region and display a function indicator related to the currently executing at least one application on the second region. As a different embodiment, the terminal 100 can display information on an external device, which is connected or communicating with the terminal, on the first region and display a function indicator related to the external device, which is connected or communicating with the terminal, on the second region. As a further different embodiment, the terminal 100 can display information on an embedded storing means on the first region and display a function indicator related to the embedded storing means on the second region.

The second region may correspond to a partial region of the entire display region of the display unit 151. For example, the second region may correspond to a region located at an opposite end of the first region. As an embodiment, the second region may correspond to a region located at the topmost of the entire display region of the display unit 151. And, the second region may correspond to a region adjacent to the first region or a region contacted with the first region. For example, the second region can be located at one side of the display unit 151 according to a selection of a user or a designer. As an embodiment, the second region can be located at a side display. In this case, the side display can include an edge display. Similar to the second region, the first region can be located at one side of the display unit 151 or a side display.

The terminal 100 can obtain an input for selecting at least one function indicator displayed on the display unit [S240] and can perform a function corresponding to a selected function indicator [S250].

For example, the controller 180 can obtain an input for selecting at least one indicator from among function indicators displayed on the second region of the display unit 151 and can control a function corresponding to a selected function indicator to be performed. As an embodiment, if a function indicator displayed on the second region corresponds to a function indicator indicating a currently executing application, the controller 180 can perform a function or an operation of the application corresponding to the selected function indicator. As a different embodiment, if a function indicator displayed on the second region corresponds to a function indicator related to an external device which is connected or communicating with the terminal, the controller 180 can control the external device to perform a function or an operation corresponding to the selected function indicator or transmit a signal to the external device. As a further different embodiment, if a function indicator displayed on the second region corresponds to a function indicator related to an embedded storing means, the controller 180 can control a file or data corresponding to the selected function indicator to be stored or read.

In the following, specific embodiments are explained with reference to FIGS. 8 to 11.

Figure 8:
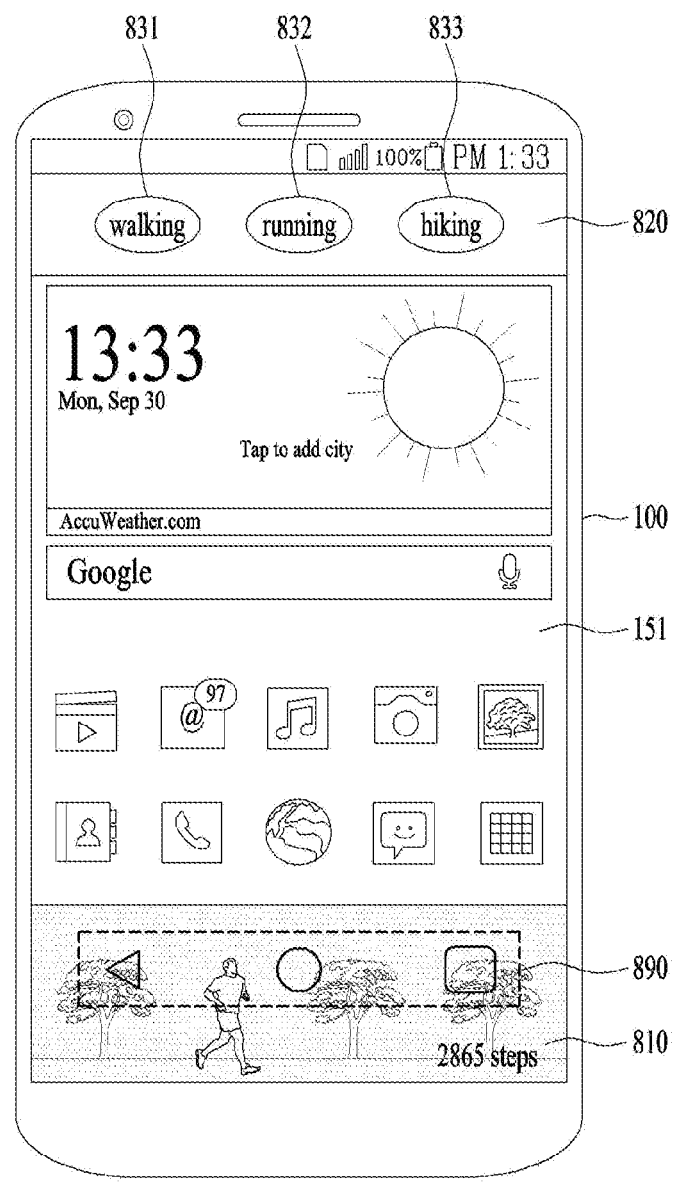
FIG. 8 is diagram for an example of displaying a health application on a first region and a second region according to various embodiments of the present invention.

FIG. 8 is diagram for an example of displaying a health application on a first region and a second region according to various embodiments of the present invention.

Referring to FIG. 8, the terminal 100 can display a soft key 890 and information on a currently executing health application on the first region 810 of the display unit 151. Regarding this, since it has been explained in the foregoing description, detail explanation is omitted at this time. The terminal 100 can display function indicators 831/832/833 related to the currently executing health application on the second region 820 of the display unit 151. For example, the terminal 100 can display a walking indicator 831, a running indicator 832, and a hiking indicator 833 corresponding to selectable function indicators for a body activity on the second region 820. If an input for selecting a function indicator from among the function indicators 831/832/833 displayed on the second region 820 is obtained, the terminal 100 can perform a function corresponding to the selected function indicator. For example, if the terminal 100 obtains an input for selecting the walking indicator 831 from among the function indicators 831/832/833 displayed on the second region 820, the health application can perform tracking on a walking exercise. For example, the terminal 100 can calculate a walking distance of a user, time, a step count, calorie consumption, and the like. In particular, a user can control the terminal 100 to perform a function of the health application without switching a screen of the health application. The terminal 100 can prevent interference between regions or an incorrect input by separating the first region 810 on which the soft key 890 is displayed from the second region 820 on which the functions indicators 831/832/833 are displayed.

Figure 9:
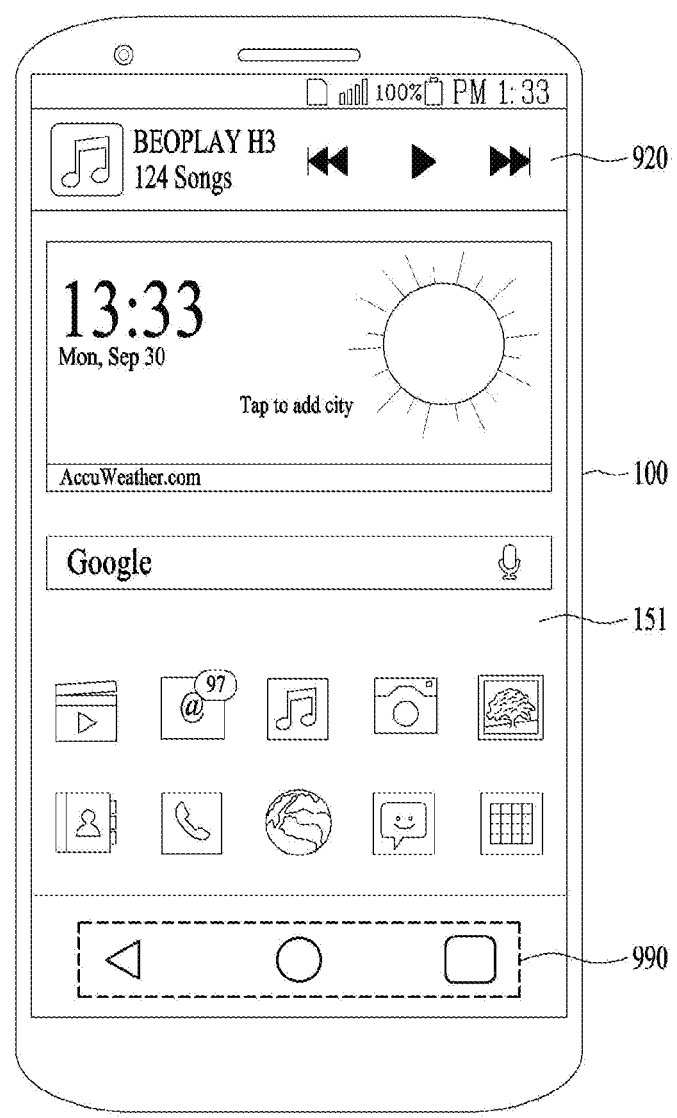
FIG. 9 is diagram for an example of displaying a headset on a second region according to various embodiments of the present invention.

FIG. 9 is diagram for an example of displaying a headset on a second region according to various embodiments of the present invention.

Referring to FIG. 9, the terminal 100 can be connected with a headset corresponding to an external device or can communicate with the headset. The terminal 100 can display information on the headset on the first region to display the information related to the headset connected with the terminal. The terminal 100 can display a function indicator related to the connected headset on the second region 920. For example, the terminal 100 can display a play indicator, a previous indicator, a next indicator, and a volume indicator on the second region 920 as the function indicator related to the connected headset. When the function indicator is displayed on the second region 920, the terminal 100 can maintain the first region on which the information on the connected headset is displayed or eliminate the first region. If the first region is eliminated, the terminal 100 can display a soft key 990 only on a location from which the first region is eliminated. For example, the terminal 100 can display a navigation bar 990 including a home key, a back key, and a menu key. The terminal 100 can obtain an input inputted on the function indicator displayed on the second region 920 and perform a function or an operation corresponding to the selected function indicator. For example, if an input for selecting the play indicator displayed on the second region 920 is obtained, the terminal 100 can control music content to be played in the headset. In particular, a user can control a function or an operation of the headset without switching a screen of the connected headset. And, when the terminal 100 displays the second region 920, the terminal 100 can eliminate the first region and display the soft key 990 only.

FIG. 10 is diagram for an example of displaying a storing means on a second region according to various embodiments of the present invention.

Referring to FIG. 10, the terminal 100 can be connected with a storing means. For example, a storing means can be inserted into the terminal 100 and the storing means can be connected with the interface unit 160 of the terminal 100. The terminal 100 can display information on the connected storing means on the first region to display information on the storing means. The terminal 100 can display a function indicator related to the connected storing means on the second region 1020. For example, the terminal can display a file explorer for the connected storing means on the second region 1020. As an embodiment, the terminal 100 can display a folder for the files stored in the storing means or a file on the second region 1020. When the function indicator is displayed on the second region 1020, the terminal 100 can maintain the first region on which the information on the connected storing means is displayed or eliminate the first region. If the first region is eliminated, the terminal 100 can display the soft key 1090 only on a location from which the first region is eliminated. For example, the terminal 100 can display a navigation bar including a home key, a back key, and a menu key. The terminal 100 can obtain an input inputted on the file explorer displayed on the second region 1020 and perform a reading or writing operation on a selected file or folder. In particular, a user can read data stored in the storing means or store data in the storing means without switching a screen of the connected storing means. And, when the terminal 100 displays the second region 1020, the terminal 100 can eliminate the first region and display the soft key 1090 only.

Figure 11:
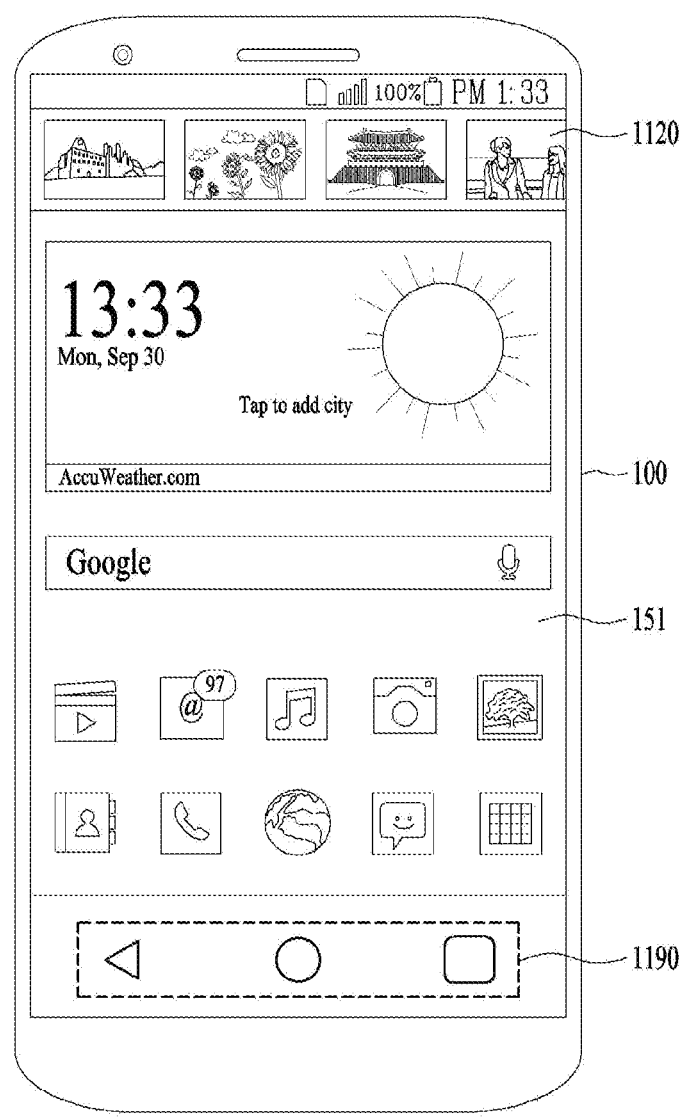
FIG. 11 is diagram for an example of displaying a head mounted display on a second region according to various embodiments of the present invention.

FIG. 11 is diagram for an example of displaying a head mounted display on a second region according to various embodiments of the present invention.

Referring to FIG. 11, the terminal 100 can be connected with a head mounted display corresponding to an external device or can communicate with the head mounted display. The terminal 100 can display information on the head mounted display on the first region to display the information related to the head mounted display connected with the terminal. The terminal 100 can display a function indicator related to the connected head mounted display on the second region 1120. For example, the terminal 100 can display a list of contents capable of being outputted via the connected head mounted display on the second region 1120. As an embodiment, the terminal 100 can display thumbnail images for a plurality of contents capable of being outputted via the connected head mounted display on the second region 1120. As a different embodiment, the terminal 100 can display a control indicator indicating contents currently outputted in the head mounted display. For example, the terminal can display a function indicator related to content output, a play/stop indicator, a previous indicator, and a next indicator on the second region 1120. When the function indicator related to the connected head mounted display is displayed on the second region 1120, the terminal 100 can maintain the first region on which the information on the connected head mounted display is displayed or eliminate the first region. If the first region is eliminated, the terminal 100 can display the soft key 1190 only on a location from which the first region is eliminated. For example, the terminal 100 can display a navigation bar 1190 including a home key, a back key, and a menu key. The terminal 100 can obtain an input for selecting content from the list of contents displayed on the second region 1020 and can control the selected content to be outputted in the head mounted display. In particular, a user can control a function or an operation of the head mounted display without switching a screen of the connected head mounted display. And, when the terminal 100 displays the second region 1120, the terminal 100 can eliminate the first region and display the soft key 1190 only.

The terminal 100 according to various embodiments can obtain an input inputted between the first region and the second region displayed on the display unit 151 and perform a function or an operation according to the obtained input. For example, if an input for moving one of information displayed on the first region to the main region is obtained, the terminal 100 can display the dragged information on the main region. As an embodiment, if an input for dragging information displayed on the first region to the main region is obtained, the terminal 100 can display the information on the entire region of the display unit 151 in response to a task corresponding to the first region. As a different embodiment, if an input for moving information or content displayed on the main region to the first region is obtained, the terminal 100 can display the moved information or content on the first region. And, if the information or content moved to the first region corresponds to playable information or content, the terminal 100 can play the information or content. As a further different embodiment, if an input for moving information or content displayed on the main region to a first region or a second region corresponding to an external device is obtained, the terminal 100 can output the moved information or content in the external device or can transmit the moved information or content to the external device. If an input for moving information or content displayed on the main region to a first region or a second region corresponding to a storing means is obtained, the terminal 100 can store the moved information or content in the storing means. If an input for moving information or content corresponding to the first region or the second region to the main region is obtained, the terminal 100 can store or output the moved information or content in the terminal 100. In particular, the terminal 100 can perform an operation or a function according to an input inputted among the first region, the second region, and the main region of the display unit 151.

Specific embodiments are explained with reference to FIG. 12 in the following.

Figure 12:
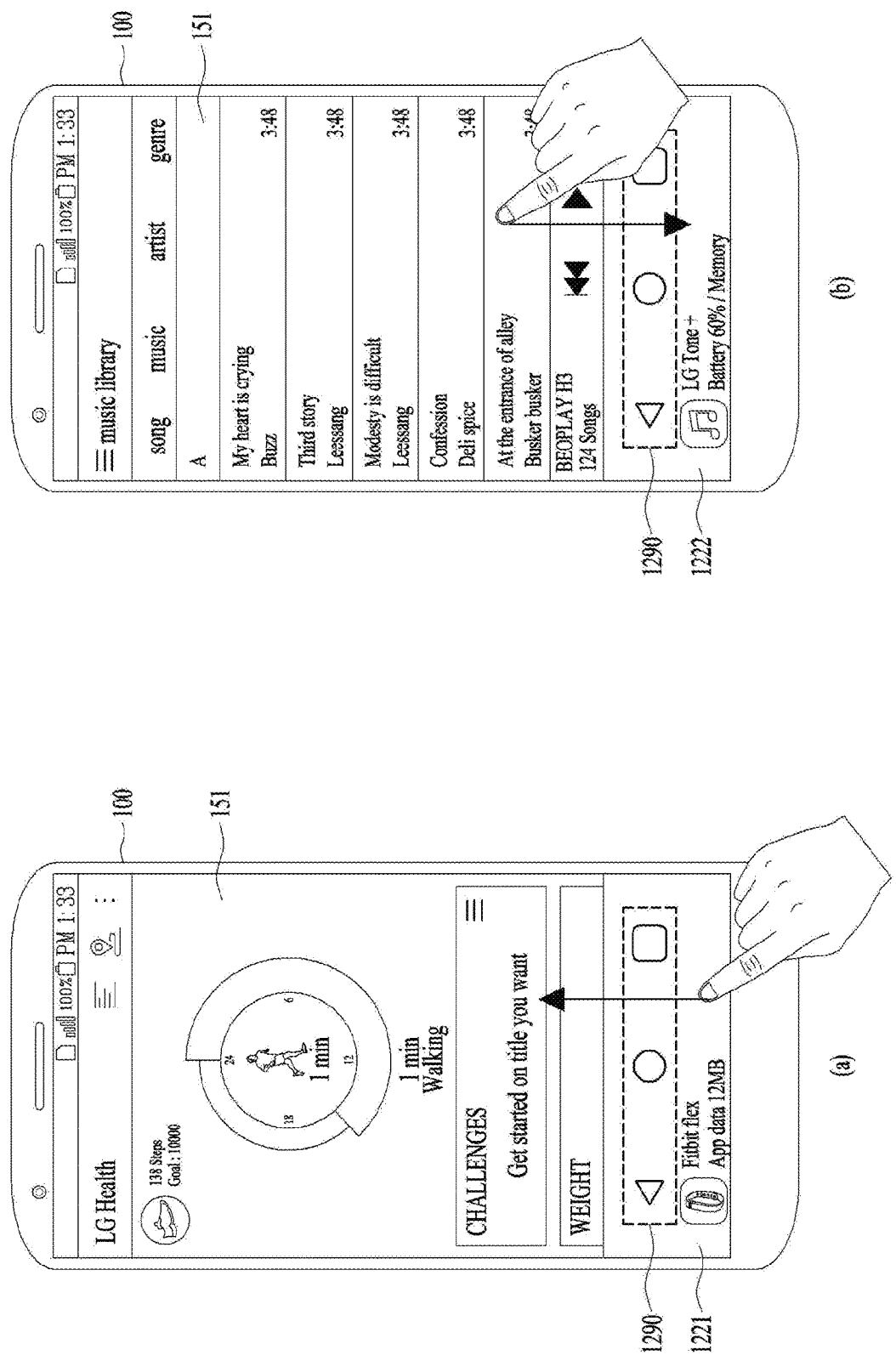
FIG. 12 is a diagram for an example of an operation according to an input inputted between a first region and a main region according to various embodiments of the present invention.

FIG. 12 is a diagram for an example of an operation according to an input inputted between a first region and a main region according to various embodiments of the present invention.

Referring to FIG. 12 (*a*), the terminal 100 can be connected with a health device and can display information on the connected health device and a soft key 1290 on the first region 1221. The terminal 100 can display a screen of a health application on the main region. The terminal 100 can obtain an input for moving physical activity information displayed on the first region 1221 to the main region. The terminal 100 can control the health device to transmit the physical activity information stored in the health device to the terminal 100 according to the obtained input. Having received the physical activity information, the terminal 100 can display the information on the main region of the display unit 151. And, the terminal 100 can store the received physical activity information in the memory 170.

Referring to FIG. 12 (*b*), the terminal 100 can be connected with a headset and can display information on the connected headset and a soft key 1290 on the first region 1222. The terminal 100 can display a list of music contents on the main region. The terminal 100 can obtain an input for moving at least one or more contents of the list of contents displayed on the main region to the first region 1222. The terminal 100 can control the headset to play the selected content in the headset according to the obtained input. And, the terminal 100 can transmit the selected music content to the headset.

In particular, the terminal 100 can obtain an input inputted on the first region or an input inputted between the second region and the main region displayed on the display unit 151 and can perform a function or an operation according to the obtained input.

The terminal 100 according to various embodiments can switch the first region or the second region according to an obtained input. Regarding this, it is explained in detail with reference to FIGS. 13 to 14 in the following.

FIG. 13 is a diagram for an example of switching a second region into a first region according to various embodiments of the present invention.

Referring to FIG. 13, the terminal 100 can display a second region 1320 on the topmost of the display unit 151. The terminal 100 can display function indicators 1331/1332/1333 related to a currently executing health application on the second region 1320. For example, the terminal 100 can display a walking indicator 1331, a running indicator 1332, and a hiking indicator 1333 corresponding to function indicators for a physical activity capable of being selected from the health application on the second region 1320. And, the terminal 100 can display a soft key 1390 on the bottommost of the display unit 151. For example, the terminal 100 can display a navigation bar 1390 including a home key, a back key, and a menu ley on the bottommost of the display unit 151. The terminal can obtain an input for eliminating the displayed second region 1320 and displaying the first region 1310. For example, the terminal 100 can obtain an input of swiping two fingers in up direction as an input for switching to first region display from second region display. If an input for eliminating the second region 1320 and displaying the first region 1310 is obtained, the terminal 100 eliminates the second region 1320 and displays the first region 1310. For example, the terminal 100 eliminates the second region 1320 displayed on the topmost of the display unit 151 and can display the information on the currently executing health application and the soft key 1390 on the first region 1310 located at the bottommost of the display unit 151. Since the first region display of the terminal 100 has already been described, detail explanation is omitted at this time.

FIG. 14 is a diagram for an example of switching a first region into a second region according to various embodiments of the present invention.

Referring to FIG. 14, the terminal 100 can display a first region 1410 on the bottommost of the display unit 151. The terminal 100 can display information on a currently executing health application and a soft key 1490 on the first region 1410. For example, the terminal 100 can display information on physical activity tracked by the health application and the soft key 1490 on the first region 1410. For example, the terminal 100 can display a navigation bar 1490 including a home key, a back key, and a menu ley on the first region 1410 on which the information on the health application is displayed as a background image. The terminal 100 can obtain an input for eliminating the displayed first region 1410 and displaying the second region 1420. For example, the terminal 100 can obtain an input of swiping two fingers in down direction as an input for switching to second region display from first region display. If an input for eliminating the first region 1410 and displaying the second region 1420 is obtained, the terminal 100 eliminates the first region 1410 and displays the second region 1420. For example, the terminal 100 eliminates the first region 1410 displayed on the bottommost of the display unit 151 and can display function indicators 1431/1432/1433 related to the currently executing health application on the second region 1420 located at the topmost of the display unit 151. For example, the terminal 100 can display a walking indicator 1431, a running indicator 1432, and a hiking indicator 1433 corresponding to function indicators for a physical activity capable of being selected from the health application on the second region 1420. The terminal 100 can display the soft key 1490 of the display unit 151.

As mentioned in the foregoing description, the terminal 100 can switch between first region displaying and second region displaying according to an obtained input.

If an input for selecting a function indicator displayed on the second region is obtained, the terminal 100 according to various embodiments can further display a detail function indicator corresponding to the selected function indicator. For example, if an input for selecting an upper menu displayed on the first region is obtained, the terminal 100 can further display a submenu corresponding to the selected upper menu. And, the terminal 100 can switch a submenu into an upper menu according to an input inputted on the second region. Regarding this, it is explained with reference to FIGS. 15 to 16 in the following.

Figure 15:
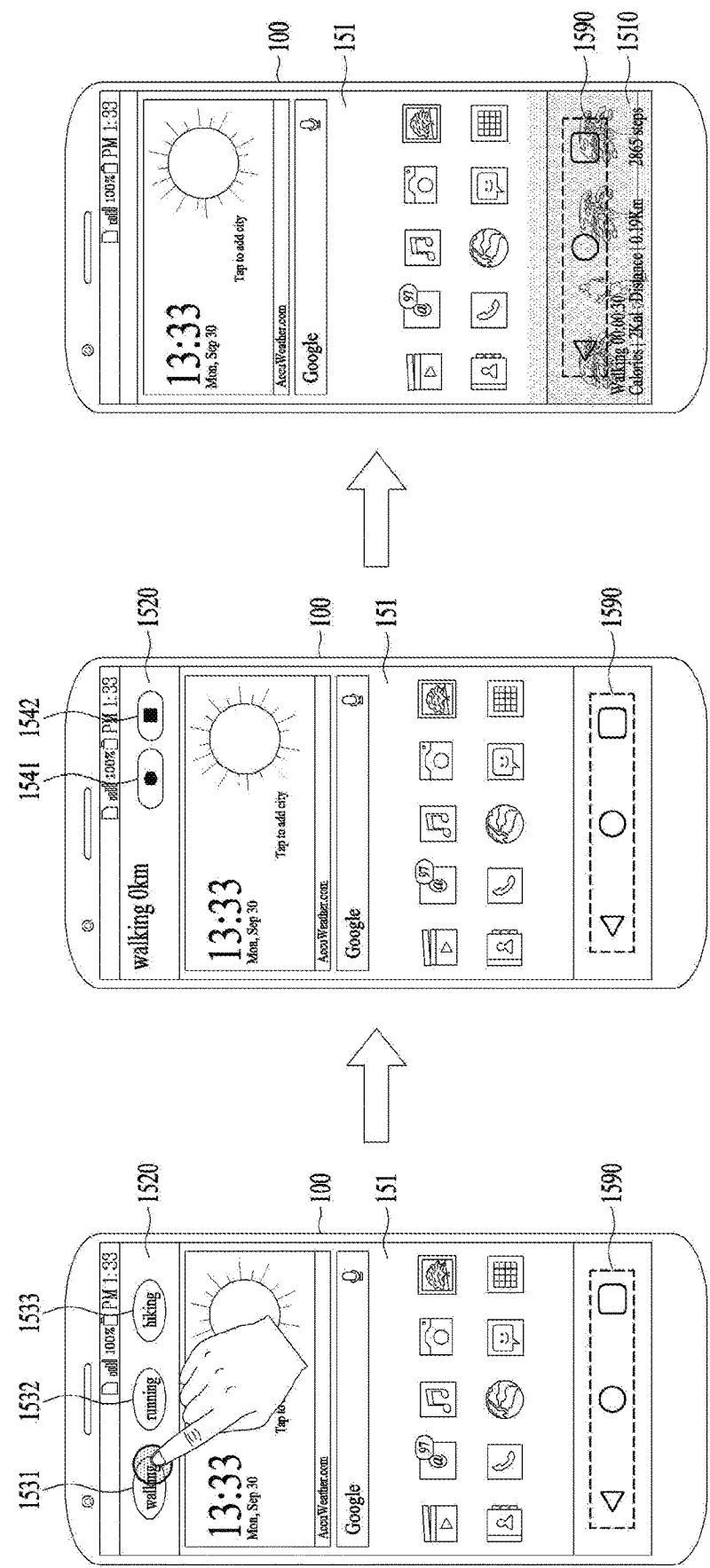
FIG. 15 is a diagram for an example of selecting a function displayed on a second region according to various embodiments of the present invention.

FIG. 15 is a diagram for an example of selecting a function displayed on a second region according to various embodiments of the present invention.

Referring to FIG. 15, the terminal 100 can display function indicators 1531/1532/1533 related to a currently executing health application on the second region 1520 located at the topmost of the display unit 151. If an input for selecting a walking indicator 1531 from the function indicators displayed on the second region 1520 is obtained, the terminal 100 can display a detail function indicator for tracking a walking exercise corresponding to the selected walking indicator 1531 on the second region 1520. For example, the terminal 100 can display a start button 1541 for starting the tracking of the walking exercise and an end button 1542 for terminating the tracking on the second region 1520. If an input for selecting the start button 1541 is obtained, the terminal 100 can start to track the walking exercise. If the walking exercise tracking starts, the terminal 100 can display the first region 1510 while the second region 1520 is eliminated. And, the terminal 100 can display information on the walking exercise tracked by the terminal and a soft key 1590 on the first region 1510.

Figure 16:
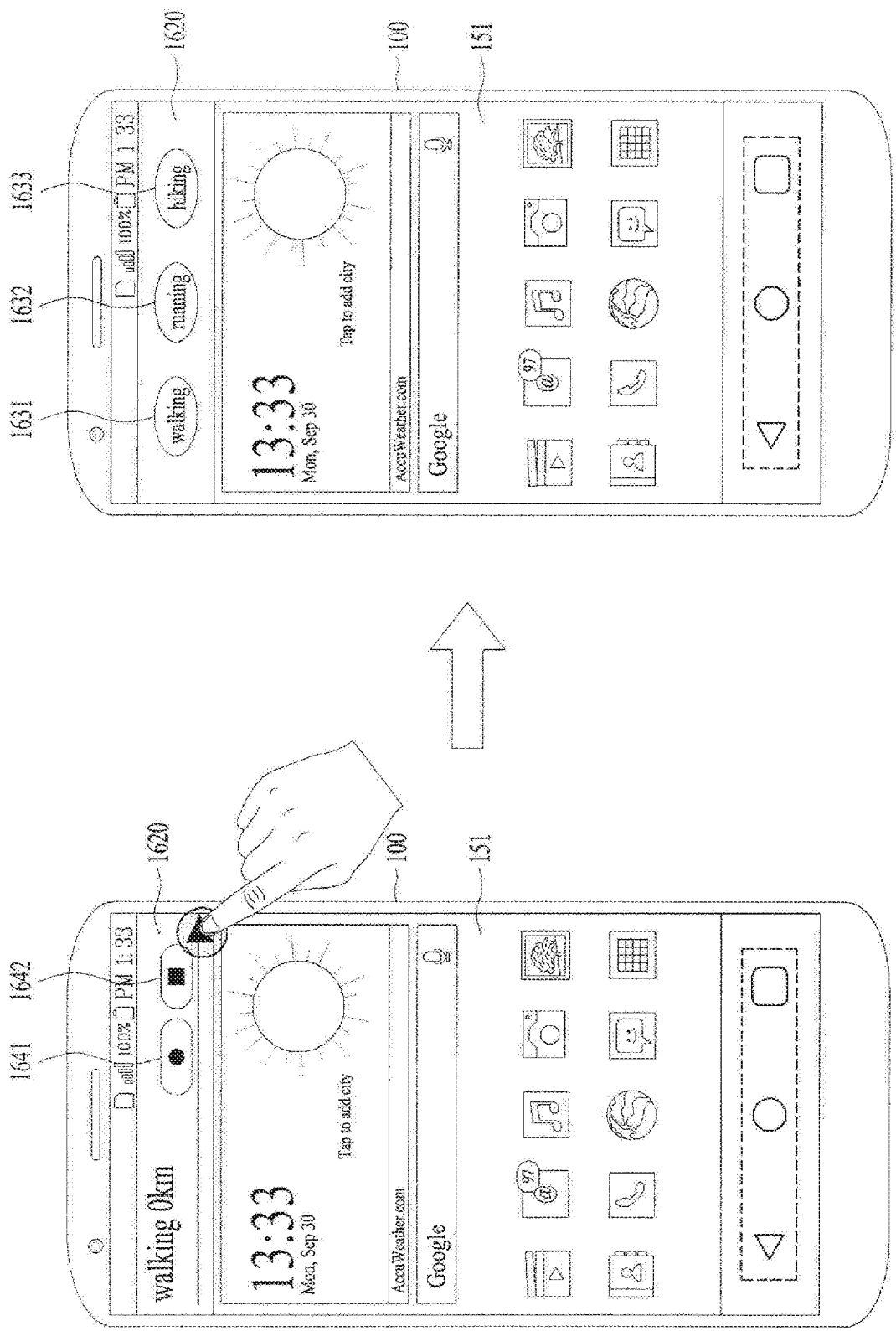
FIG. 16 is a diagram for an example of displaying a previous menu according to various embodiments of the present invention.

FIG. 16 is a diagram for an example of displaying a previous menu according to various embodiments of the present invention.

Referring to FIG. 16, the terminal 100 can display detail function indicators of a walking indicator 1631 including a start button 1641 and an end button 1642 on the second region 1620. In this case, the detail function indicators 1641/1642 may correspond to a submenu of the walking indicator 1631. If an input of swiping the second region 1620 in one direction is obtained, the terminal 100 can display function indicators 1631/1632/1633 corresponding to an upper menu. For example, if an input of swiping to the right is obtained, the terminal 100 can display a walking indicator 1631, a running indicator 1632, and a hiking indicator 1633 on the second region 1620. In particular, the terminal 100 can display an upper menu or a submenu of a function indicator displayed on the second region 1620 by switching between the upper menu and the submenu according to an input inputted on the second region 1620.

The terminal 100 according to various embodiments executes a new task related to at least one task displayed on the first region and displays a screen of the executed new task on the second region. Regarding this, it is explained with reference to FIGS. 17 to 18 in the following.

FIG. 17 is a diagram for an example of displaying an indicator for a new task according to various embodiments of the present invention.

FIG. 18 is a diagram for an example of displaying a selected link according to various embodiments of the present invention.

Referring to FIG. 17, the terminal 100 can execute a messenger application and display a screen of the messenger application and a soft key 1790 on the first region 1710. In this case, the messenger application may correspond to a message application. For example, the controller 180 can display a message transceived with a counterpart on the first region 1710 according to the executed messenger application. As an embodiment, the controller 180 can display messages 1751/1752 received from Jane corresponding to a counterpart on the first region 1710. The terminal 100 can display an indicator indicating contents, which are incapable of being displayed on the first region 1710 such as an image, a video, a link and the like transceived with the counterpart, corresponding to the messages displayed on the first region 1710 on the second region 1720. For example, if an input for displaying the second region 1720 is obtained, the terminal 10—can display the second region 1720. As an embodiment, the terminal 100 can obtain an input of swiping in down direction using two fingers as the input for displaying the second region 1720. In this case, the terminal 100 can display the second region 1720 while eliminating the first region 1710. Or, the terminal can display the second region 1720 while maintaining the first region 1710. The terminal 100 can display an indicator indicating a first image 1761, a second image 1762, a first video 1763, and a first link 1764 transceived with the Jane in the messages 1751/1752, which was displayed on the first region 1710, on the second region 1720. And, the terminal 100 can obtain an input for selecting an indicator from among the indicators 1761/1762/1763/1764 displayed on the second region 1720 and may be then able to display content corresponding to the selected indicator on the second region 1720. For example, if an input for selecting the first link indicator 1764 displayed on the second region 1720 is obtained, the terminal 100 can display a web page corresponding to the first link indicator 1764 on the second region 1720. Referring to FIG. 18, the terminal 100 can display a web page corresponding to a first link indicator 1764 displayed on the second region 1820. If an input is inputted on the second region 1820 on which the web page is displayed, the terminal 100 may move the web page displayed on the second region 1820 according to the input. For example, if an input for scrolling the second region 1820 on which the web page is displayed is obtained, the terminal 100 can move the web page in response to the scroll input. In particular, the terminal 100 can display an indicator indicating a new task, which is related to a task displayed on the first region, on the second region. If an input for selecting the indicator indicating the new task displayed on the second region is obtained, the terminal 100 can display a screen of the new task corresponding to the selected indicator on the second region. In particular, a user can check a new task, which is related to a task displayed on the first region, on the display unit 151 of the terminal 100 without switching a screen.

The terminal 100 according to various embodiments can eliminate both the first region and the second region displayed on the display unit 151 according to an obtained input. Regarding this, it is explained with reference to FIG. 19 in the following.

Figure 19:
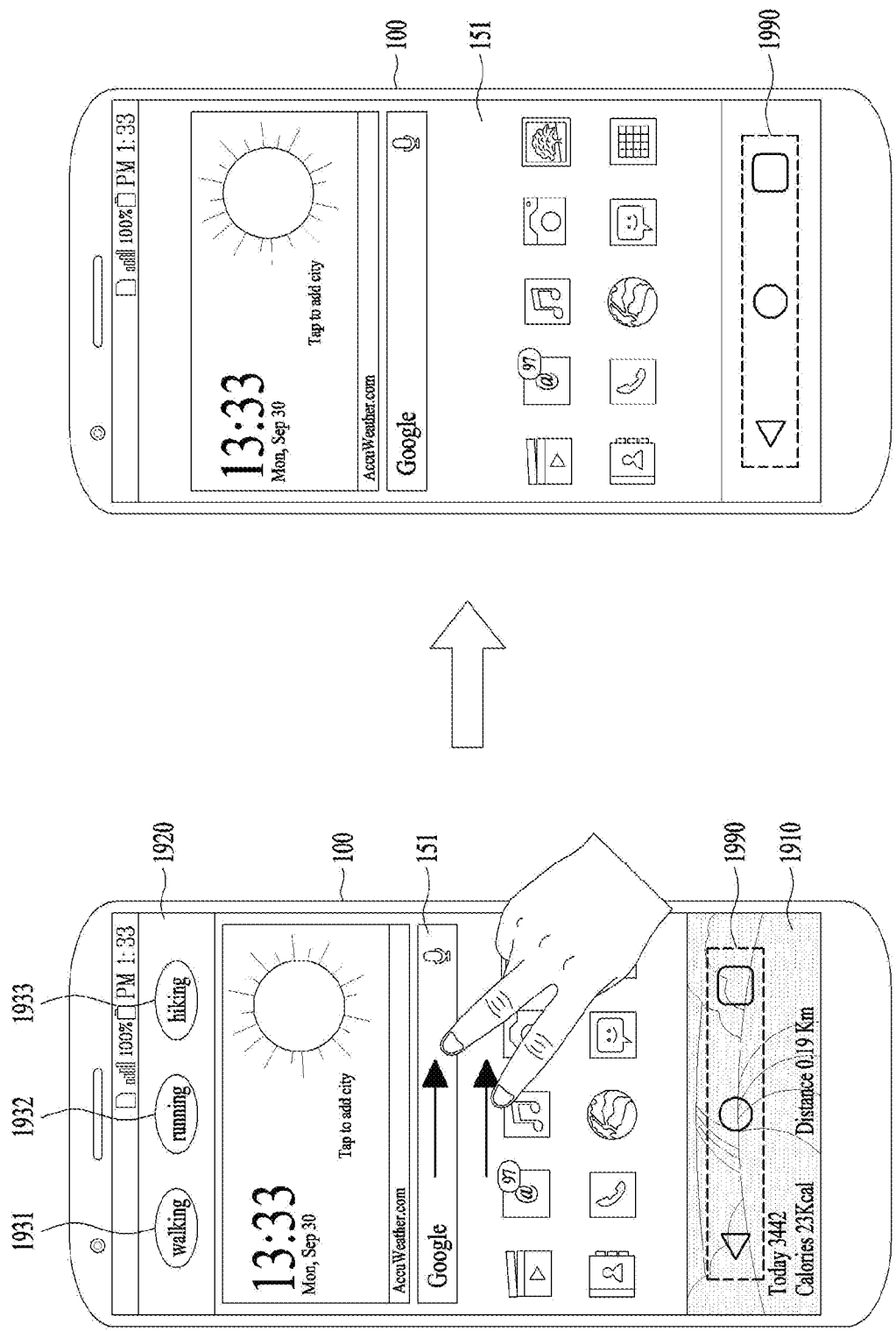
FIG. 19 is a diagram for an example of eliminating a first region and a second region according to various embodiments of the present invention.

FIG. 19 is a diagram for an example of eliminating a first region and a second region according to various embodiments of the present invention.

Referring to FIG. 19, the terminal 100 can display the first region 1910 at the bottommost of the display unit 151 and display the second region 1920 at the topmost of the display unit. For example, the terminal 100 can display information on an executed health application and a soft key 1990 on the first region 1910 and display function indicators 1931/1932/1933 related to the health application on the second region 1920. The terminal 100 can obtain an input for eliminating the first region 1910 and the second region 1920. For example, the terminal 100 can obtain a swiping input inputted in one direction using two fingers as the input for eliminating the first region 1910 and the second region 1920. If the input for eliminating the first region 1910 and the second input 1920 is obtained, the terminal 100 eliminates the first region 1910 and the second region 1920 displayed on the display unit 151 and can display a soft key 1990 at the bottommost of the display unit 151.

The terminal 100 according to various embodiments obtains an input for selecting at least one task to be displayed on the first region and the second region and displays information on the selected task and a function indicator on the first region and the second region, respectively. Regarding this, it is explained with reference to FIG. 20 in the following.

Figure 20:
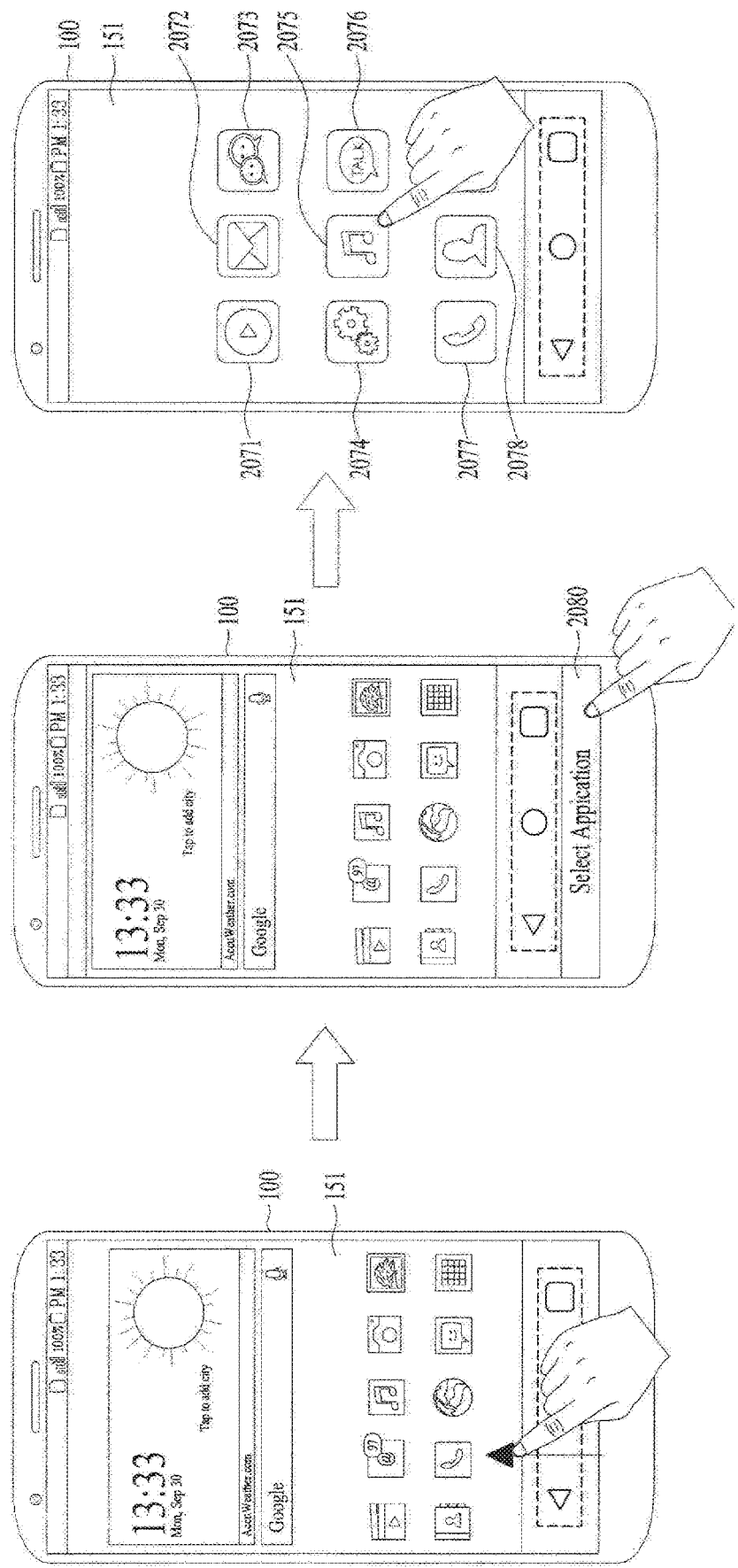
FIG. 20 is a diagram for an example of selecting a task according to various embodiments of the present invention.

FIG. 20 is a diagram for an example of selecting a task according to various embodiments of the present invention.

Referring to FIG. 20, the terminal 100 can obtain an input for flicking the bottom of the display unit 151 in up direction. If a bezel flicking input is obtained, the terminal 100 can display a selection menu 2080 for selecting an application. If an input for selecting the selection menu 2080 is obtained, the terminal 100 can display a plurality of application lists. For example, the terminal 100 can display a plurality of application icons 2071 to 2078 capable of being selected on the display unit 151. The terminal 100 can obtain an input for selecting an application from the displayed list. For example, the terminal 100 can obtain an input for selecting a music application 2075 from a plurality of the application icons 2071 to 2078 displayed on the display unit. And, the terminal 100 executes the selected music application and may be able to display information on the executed music application on the first region. And, the terminal 100 can display a function indicator related to the executed music application on the second region.

If a long press input inputted on a home button or a force input inputted by power equal to or greater than prescribed strength is inputted, the terminal 100 can display a first region and a second region for a task, which was displayed in a full screen of the display unit 151.

As a different example, if a long press input inputted on a home button or a force input inputted by power equal to or greater than prescribed strength is inputted, the terminal 100 can display a list capable of selecting a task to be executed. The terminal 100 obtains an input for selecting a task from the displayed list and may be able to display information on the selected task and a function indicator on the first region and the second region, respectively. Since the above-mentioned procedure is described in the foregoing description, detail explanation is omitted at this time.

In particular, the terminal 100 can select tasks to be displayed on the first region and the second region through various schemes.

The terminal 100 according to various embodiments can display a task screen required to be switched on a partial region of the display unit (e.g., the first region or the second region). In this case, the first region or the second region on which a new task is displayed may correspond to a sub display region. Regarding this, it is explained in detail in the following.

FIG. 21 is a diagram for an example of displaying a new task according to various embodiments of the present invention.

Referring to FIG. 21, the terminal 100 can display messages 2161/2162/2163 on the main display region 151-1. In this case, a first message 2161 can include a link for a streaming video. The terminal 100 can obtain a force input pushing the first message 2161 with power equal to or greater than prescribed strength. The terminal 100 can display a new task for the streaming video corresponding to the selected first message 2161 on the sub display region 151-2. In this case, the sub display region 151-2 may correspond to a region separated from the main display region 151-1 and can be configured by a separate display module. The terminal 100 can display information on content according to the link for the selected streaming video on the sub display region 151-2. Or, the terminal 100 can display a control indicator for controlling the content according to the link for the selected streaming video on the sub display region 151-2. For example, the terminal 100 can display a title of the content according to the link for the selected streaming video and a menu for controlling the content on the sub display region 151-2.

The terminal 100 according to various embodiments can display a screen of various sizes for a new task displayed on the display unit. Regarding this, it is explained with reference to FIGS. 22 to 23 in the following.

FIGS. 22 and 23 are diagrams for an example of controlling a screen size of a new task according to various embodiments of the present invention.

Referring to FIG. 22, the terminal 100 can display a new task for a streaming video corresponding to a message 2261 on the sub display region 151-2. The terminal 100 can obtain an input for controlling a size of a screen of the selected streaming video corresponding to the new task displayed on the sub display region 151-2. For example, the terminal 100 can obtain an input for dragging a part of the new task, which is displayed on the sub display region 151-2, in down direction. The terminal can increase the size of the screen of the selected streaming video as much as a distance corresponding to the obtained input. The terminal 100 can display the selected streaming video on the sub display region 151-2 and a part of the main display region 151-1.

Referring to FIG. 23, the terminal 100 can display a new task for a streaming video corresponding to a message 2361 on the sub display region 151-2. The terminal 100 can obtain an input for controlling a size of a screen of the selected streaming video corresponding to the new task displayed on the sub display region 151-2. For example, the terminal 100 can obtain an input for tapping the new task displayed on the sub display region 151-2. The terminal 100 can display the streaming video on the whole region of the main display region 151-1. In particular, the terminal 100 can make the new task displayed on the sub display region 151-2 to be displayed on the whole region of the main display region 151-1 in a manner of being switched according to an input. And, the terminal 100 can make the streaming video displayed on the whole region of the main display region 151-1 to be displayed on the sub display region 151-2 in a manner of being switched again according to an input.

The aforementioned description on the screen switching is not restricted by the example of the description. Besides the input according to the aforementioned description, various inputs can be configured as an input for switching a screen according to a selection of a user or a designer.

The terminal 100 according to various embodiments can display information on a new task via AoD (Always on Display). Regarding this, it is explained with reference to FIG. 24 in the following.

Figure 24:
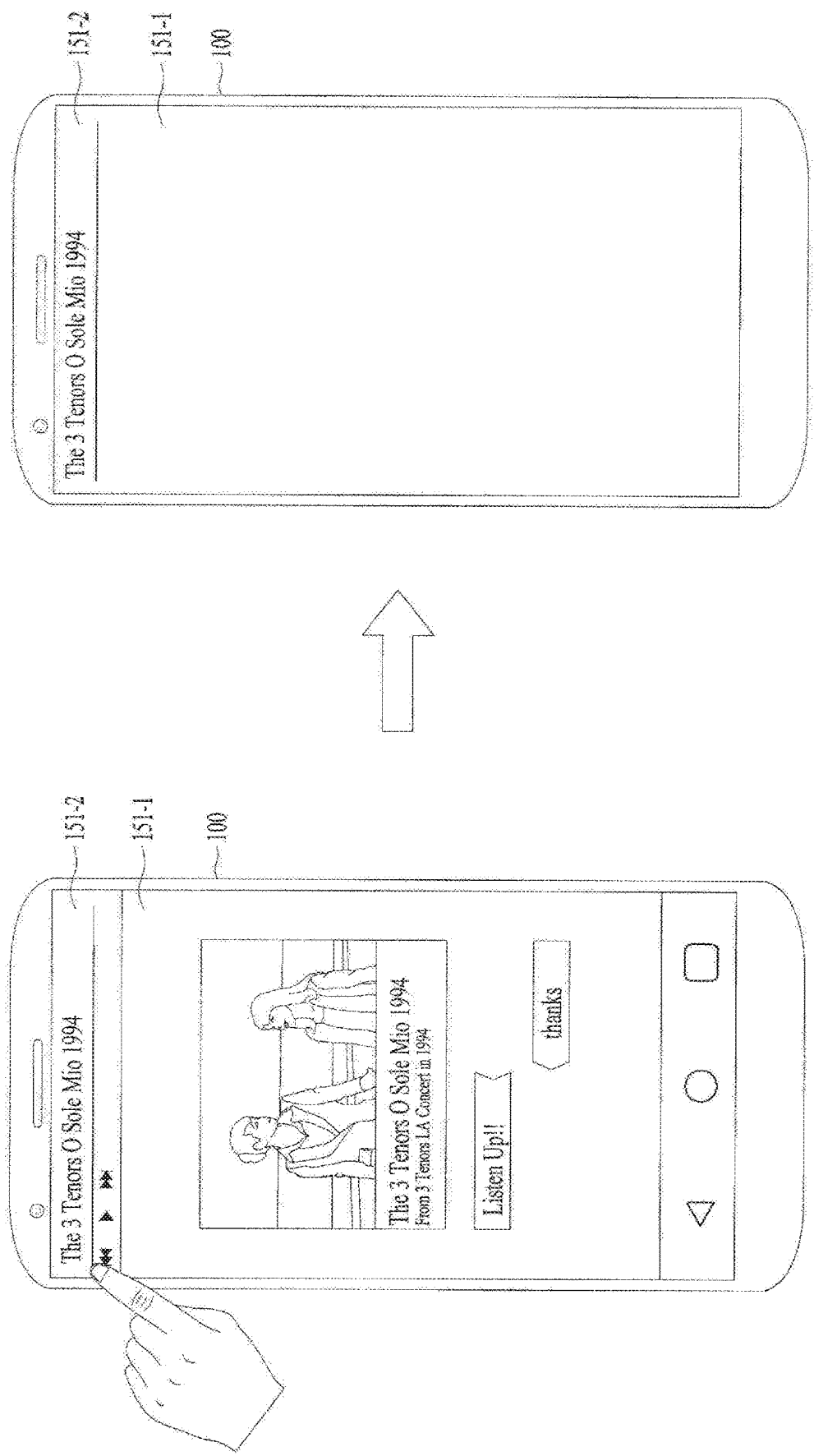
FIG. 24 is a diagram for an example of AoD (Always on Display) according to various embodiments of the present invention.

FIG. 24 is a diagram for an example of AoD (Always on Display) according to various embodiments of the present invention.

Referring to FIG. 24, the terminal 100 can display a new task for a streaming video corresponding to a message 2361 on the sub display region 151-2. The terminal 100 can obtain an input for turning off the main display region 151-1. In this case, the input for turning off the main display region 151-1 can be referred to as a knock off input. If the input for turning off the main display region 151-1 is obtained, the terminal 100 turns off the main display region 151-1 and may be able to display content information according to a link for the streaming video on the sub display region 151-2. And, the terminal 100 can also display a menu for controlling the content according to the link for the streaming video on the sub display region 151-2. In particular, the terminal 100 can display a new task via AoD (Always on Display) that turns off the main display region 151-1 and maintains the turn-on of the sub display region 151-2. Although the main display region 151-1 is turned off, the terminal 100 can continuously play the content displayed on the sub display region 151-2.

Other embodiments for displaying a new task are explained in the following with reference to FIGS. 25 to 28.

FIGS. 25 to 28 are diagrams for an example of displaying a new task according to various embodiments of the present invention.

Figure 25:
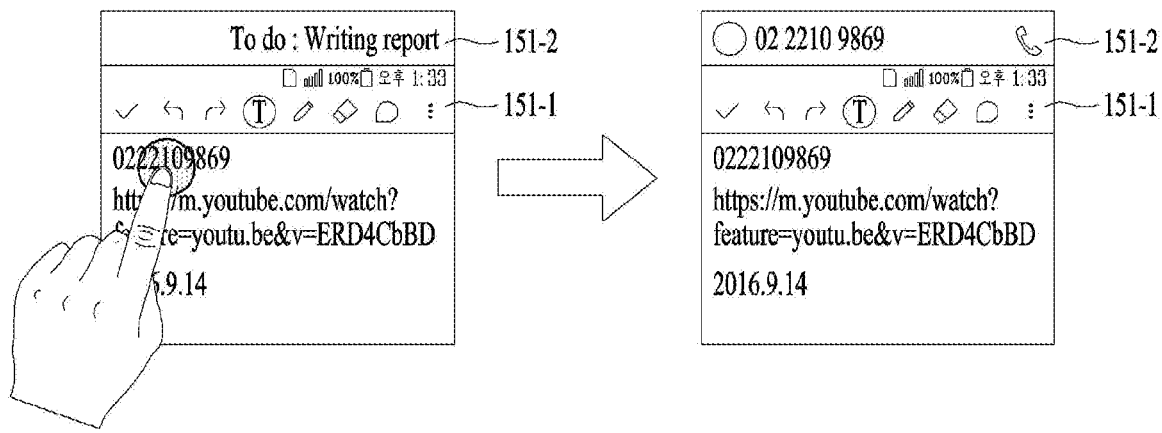
FIGS. 25 to 28 are diagrams for an example of displaying a new task according to various embodiments of the present invention.

Referring to FIG. 25, the terminal 100 can display a text according to a memo on the main display region 151-1 and display preconfigured information on the sub display region 151-2. For example, the terminal 100 can display memo on a telephone number, a web link, and date on the main display region 151-1 and display schedule information on the sub display region 151-2. The terminal 100 can obtain an input for selecting the telephone number from the memo displayed on the main display region 151-1. In this case, the input for selecting the telephone number may correspond to a long touch input or a force touch input. The terminal 100 can display a new task for the selected telephone number on the sub display region 151-2. For example, the terminal can display the selected telephone number and a phone call icon on the sub display region 151-2. If an input for selecting the phone call icon displayed on the sub display region 151-2 is obtained, the terminal 100 can make a phone call to the selected telephone number.

Figure 26:
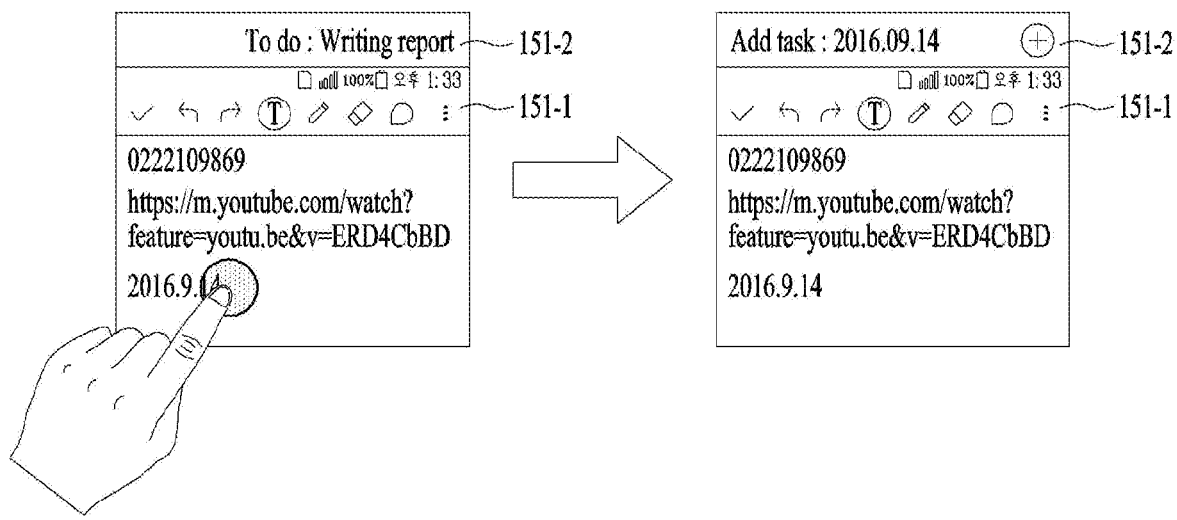

Referring to FIG. 26, the terminal 100 can display a text according to a memo on the main display region 151-1 and display preconfigured information on the sub display region 151-2. For example, the terminal 100 can display memo on a telephone number, a web link, and date on the main display region 151-1 and display schedule information on the sub display region 151-2. The terminal 100 can obtain an input for selecting the date from the memo displayed on the main display region 151-1. In this case, the input for selecting the date may correspond to a long touch input or a force touch input. The terminal 100 can display a new task for the selected date on the sub display region 151-2. For example, the terminal can display the selected date and a schedule adding icon capable of adding a new schedule to the selected date on the sub display region 151-2. If an input for selecting the schedule adding icon displayed on the sub display region 151-2 is obtained, the terminal 100 can add a new schedule for the selected date and can display a screen for inputting the new schedule for the selected date.

Figure 27:
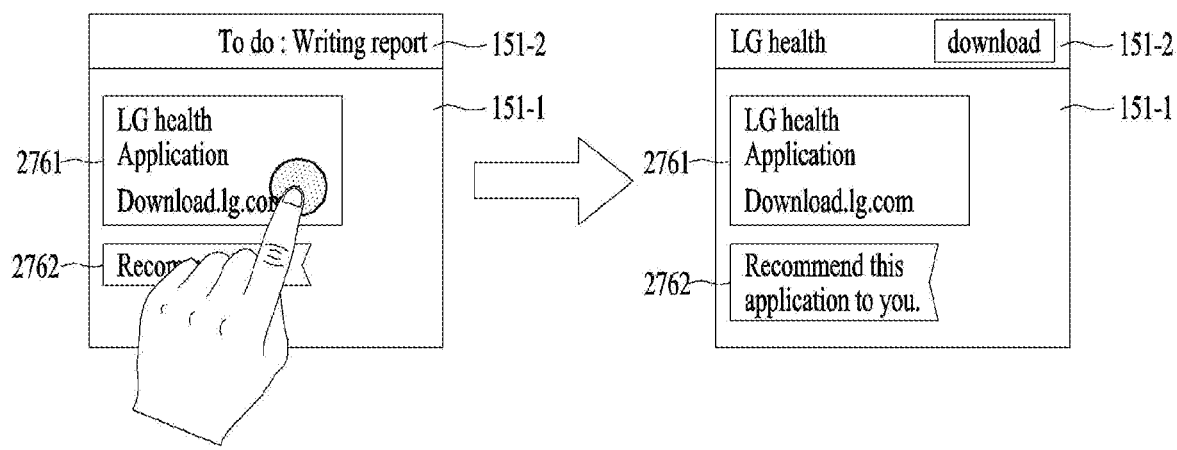

Referring to FIG. 27, the terminal 100 can display messages 2761/2762 on the main display region 151-1 and display preconfigured information on the sub display region 151-2. For example, the terminal 100 can display a first message 2761 and a second message 2762 on the main display region 151-1 and display alarm information on the sub display region 151-2. In this case, the first message 2761 can include an application download link. The terminal 100 can obtain an input for selecting the first message 2761 displayed on the main display region 151-1. In this case, the input for selecting the first message 2761 may correspond to a long touch input or a force touch input. The terminal 100 can display a new task for the application download, which is included in the first message 2761, on the sub display region 151-2. For example, the terminal 100 can display an application title corresponding to the application download link included in the first message 2761 and a download icon on the sub display region 151-2. If an input for selecting the download icon displayed on the sub display region 151-2 is obtained, the terminal 100 can download an application corresponding to the first message 2761 and install the application.

Figure 28:
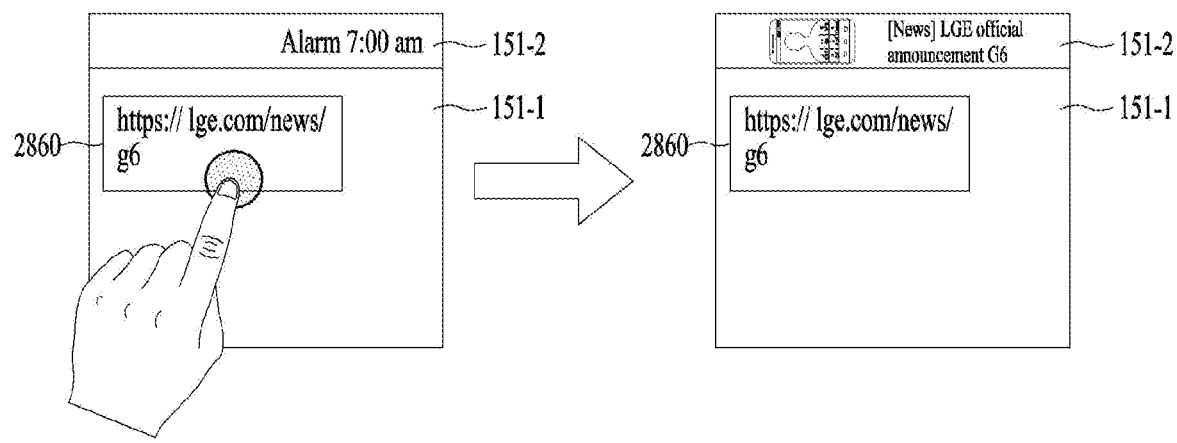

Referring to FIG. 28, the terminal 100 can display a message 2860 on the main display region 151-1 and display preconfigured information on the sub display region 151-2. For example, the terminal 100 can display a first message 2860 on the main display region 151-1 and display alarm information on the sub display region 151-2. In this case, the first message 2860 can include a webpage link. The terminal 100 can obtain an input for selecting the first message 2860 displayed on the main display region 151-1. In this case, the input for selecting the first message 2860 may correspond to a long touch input or a force touch input. The terminal 100 can display a new task according to the webpage link download, which is included in the first message 2860, on the sub display region 151-2. For example, the terminal 100 can display a webpage title corresponding to the webpage link included in the first message 2860 and a thumbnail image on the sub display region 151-2. The terminal 100 can display a part of the webpage on the sub display region 151-2 according to a size of the webpage and a size of the sub display region 151-2.

In particular, the terminal 100 can perform a function or an operation for a new task without switching a screen of the new task.

The present invention can be implemented with a code readable by a computer in a recording media readable by the computer. The recording media readable by the computer may include all kinds of recording devices for storing data capable of being read by the computer. The examples of the recording media readable by the computer may include a HDD (hard disk drive), an SSD (solid state disk), an SDD (silicon disk drive), a ROM, a RAM, a CD-ROM, a magnetic tape, a floppy disc, an optical data storing device and the like. And, implementing in a form of a carrier wave such as a transmission via the internet and the like is also included in the recording media. And, the computer can include the controller 180 of the terminal. While the present specification has been described and illustrated herein with reference to the preferred embodiments thereof, it may be non-limited to the aforementioned specific embodiment and it will be apparent to those skilled in the art that various modifications and variations can be made therein without departing from the spirit and scope of the invention. Thus, it is intended that the technical idea and prospect of the present specification covers the modifications and variations of this invention.

What is claimed is:

1. A terminal, comprising:
a display including a first sub display region, a second sub display region, and a main display region; and
a controller configured to:
cause the display to display an execution screen of at least one application on the main display region, the execution screen including at least one content;
execute the at least one content in the execution screen and cause the display to display information related to the at least one content on the first sub display region, in response to a first input for executing the at least one content;
turn off the main display region, in response to a second input for turning off the main display region;
cause the display to fixedly display the information on the first sub display region while the main display region is turned off; and
cause the display to display a soft key and an image corresponding to an execution screen of at least one task on the second sub display region as a background image.

2. The terminal of claim 1, wherein the information includes at least one of an image corresponding to an execution screen of the at least one content or at least one indicator for controlling an operation of the at least one content.

3. The terminal of claim 1, wherein the controller is further configured to turn off the second sub display region when the main display region is turned off.

4. The terminal of claim 1, wherein the controller is further configured to cause the display to fixedly display the soft key and the image on the second sub display region while another image is displayed on a remaining region of the display.

5. The terminal of claim 1, wherein the at least one task includes at least one of a task of executing an application, a task of connecting with an external device, or a task of inserting a storage.

6. The terminal of claim 5, wherein the controller is further configured to cause the display to:
display information related to the executed application on the second sub display region; and
display at least one indicator for controlling an operation of the executed application on the first sub display region.

7. The terminal of claim 6, wherein the controller is further configured to cause the display to:
display information related to the connected external device on the second sub display region; and
display at least one indicator for controlling an operation of the connected external device on the first sub display region.

8. The terminal of claim 7, wherein the controller is further configured to cause the display to:
display information related to the inserted storage on the second sub display region; and
display a file explorer for managing at least one file included in the inserted storage on the first sub display region.

9. The terminal of claim 1, wherein:
the first sub display region is located at a topmost area of the main display region; and
the second sub display region is located at a bottommost area of the main display region.

10. A method for providing information on a currently executed content of a terminal, the method comprising:
executing, via a controller, at least one application;
displaying, on a main display region of a display, an execution screen of the at least one application, the execution screen including at least one content;
executing, via the controller, the at least one content in the execution screen and displaying, on a first sub display region of the display, information related to the at least one content, in response to a first input for executing the at least one content;
turning off, via the controller, the main display region, in response to a second input for turning off the main display region;
fixedly displaying, on the first sub display region, the information while the main display region is turned off; and
displaying, on a second sub display region of the display, a soft key and an image corresponding to an execution screen of at least one task as a background image.

11. The method of claim 10, wherein the information includes at least one of an image corresponding to an execution screen of the at least one content or at least one indicator for controlling an operation of the at least one content.

12. The method of claim 10, further comprising:
turning off, via the controller, the second sub display region when the main display region is turned off.

13. The method of claim 10, further comprising:
fixedly displaying, on the second sub display region, the soft key and the image while another image is displayed on a remaining region of the display.

14. The method of claim 10, wherein the at least one task includes at least one of a task of executing an application, a task of connecting with an external device, or a task of inserting a storage.

15. The method of claim 14, further comprising:
displaying, on the second sub display region, information related to the executed application; and
displaying, on the first sub display region, at least one indicator for controlling an operation of the executed application.

16. The method of claim 14, further comprising:
displaying, on the second sub display region, information related to the connected external device; and
displaying, on the first sub display region, at least one indicator for controlling an operation of the connected external device.

17. The method of claim 14, further comprising:
displaying, on the second sub display region, information related to the inserted storage; and
displaying, on the first sub display region, a file explorer for managing at least one file included in the inserted storage.

18. The method of claim 10, wherein:
the first sub display region is located at a topmost area of the main display region; and
the second sub display region is located at a bottommost area of the main display region.

* * * * *